July 21, 1942.  R. B. P. CRAWFORD  2,290,465
AIR CONDITIONING SYSTEM
Filed April 20, 1939  5 Sheets-Sheet 1

Inventor
Robert B. P. Crawford
By George H. Fisher
Attorney

July 21, 1942. R. B. P. CRAWFORD 2,290,465
AIR CONDITIONING SYSTEM
Filed April 20, 1939 5 Sheets-Sheet 2

Inventor
Robert B. P. Crawford
By
George H. Fisher
Attorney

Inventor
Robert B. P. Crawford
By
George H Fisher
Attorney

Inventor
Robert B.P. Crawford
By
George H Fisher
Attorney

Patented July 21, 1942

2,290,465

UNITED STATES PATENT OFFICE 2,290,465

AIR CONDITIONING SYSTEM

Robert B. P. Crawford, Miami, Fla.

Application April 20, 1939, Serial No. 268,929

20 Claims. (Cl. 257—3)

This invention relates to air conditioning systems.

An object of this invention is to provide an improved automatically controlled air conditioning system for an enclosure which will act to dehumidify and cool, dehumidify and heat, ventilate, heat, and heat and humidify as required whereby desired temperature and humidity conditions are at all times automatically maintained within the enclosure.

Another object of this invention is to provide the air conditioning system with a chemical dehumidifying arrangement which under certain conditions may automatically be made to heat as well as dehumidify without the use of external heat, this being accomplished by the use of latent heat of dehumidification.

Still another object of this invention is to provide a two-stage chemical dehumidifying arrangement and an evaporator-absorber arrangement for supplying chilled water for cooling purposes wherein relatively cool solution is taken from the second stage of the dehumidifying unit and delivered to the evaporator-absorber and wherein relatively warm solution is taken from the evaporator-absorber arrangement and delivered to the first stage of the dehumidifying unit.

A further object of this invention is to utilize a vacuum pump in connection with an evaporator-absorber cooling arrangement to reduce the friction of air therein and controlling the vacuum pump to control the cooling capacity of the evaporator-absorber cooling arrangement.

Another object is to provide an air conditioning system wherein only the fresh air is dehumidified and controlling the amount of dehumidified fresh air and return air utilized in accordance with enclosure relative humidity conditions to maintain desired relative humidity conditions in the enclosure.

The combination of the various units of the air conditioning apparatus into a complete air conditioning system and the automatic control of these units to provide a completely automatic air conditioning system also form objects of this invention.

Figure 1:
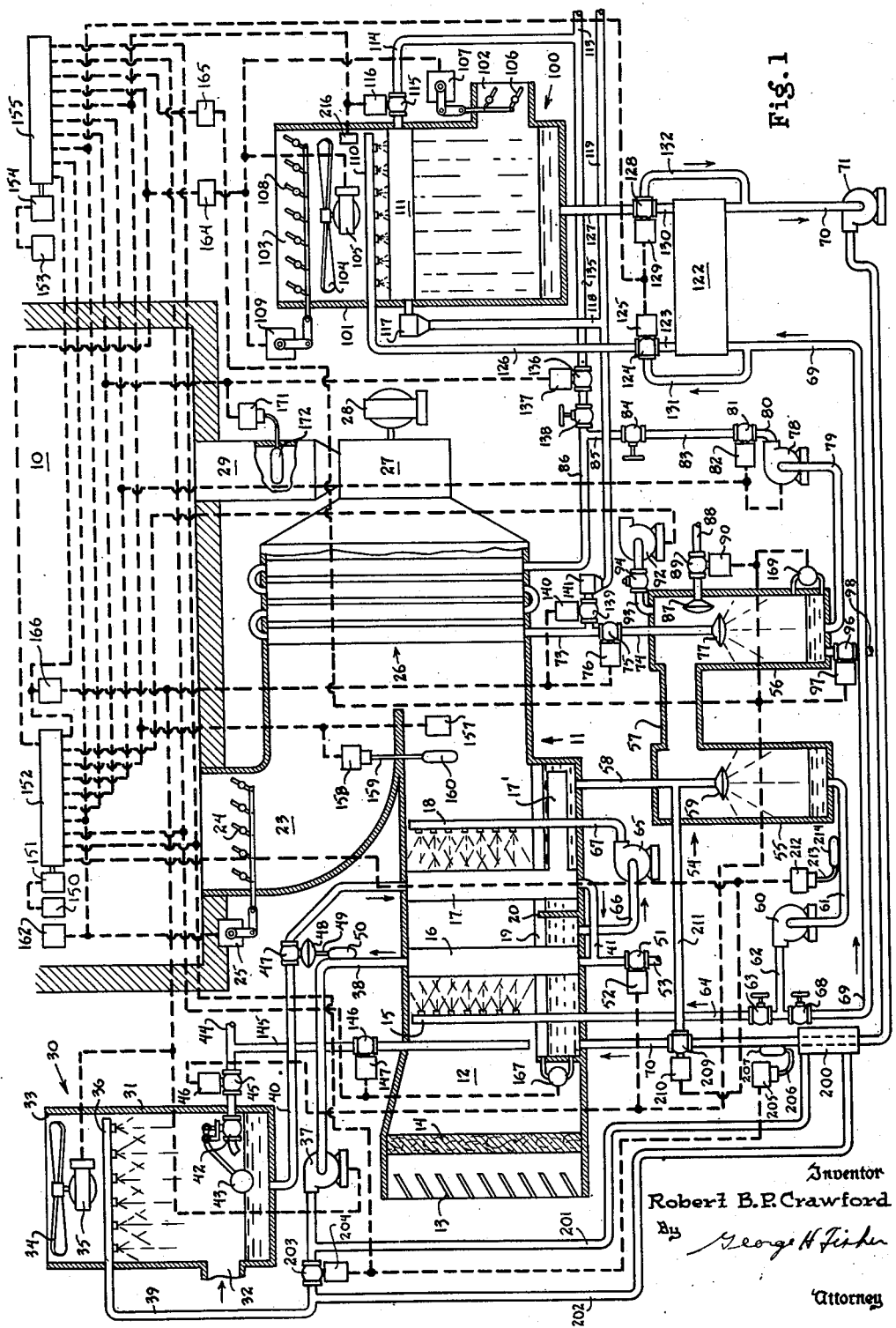
Figure 2:
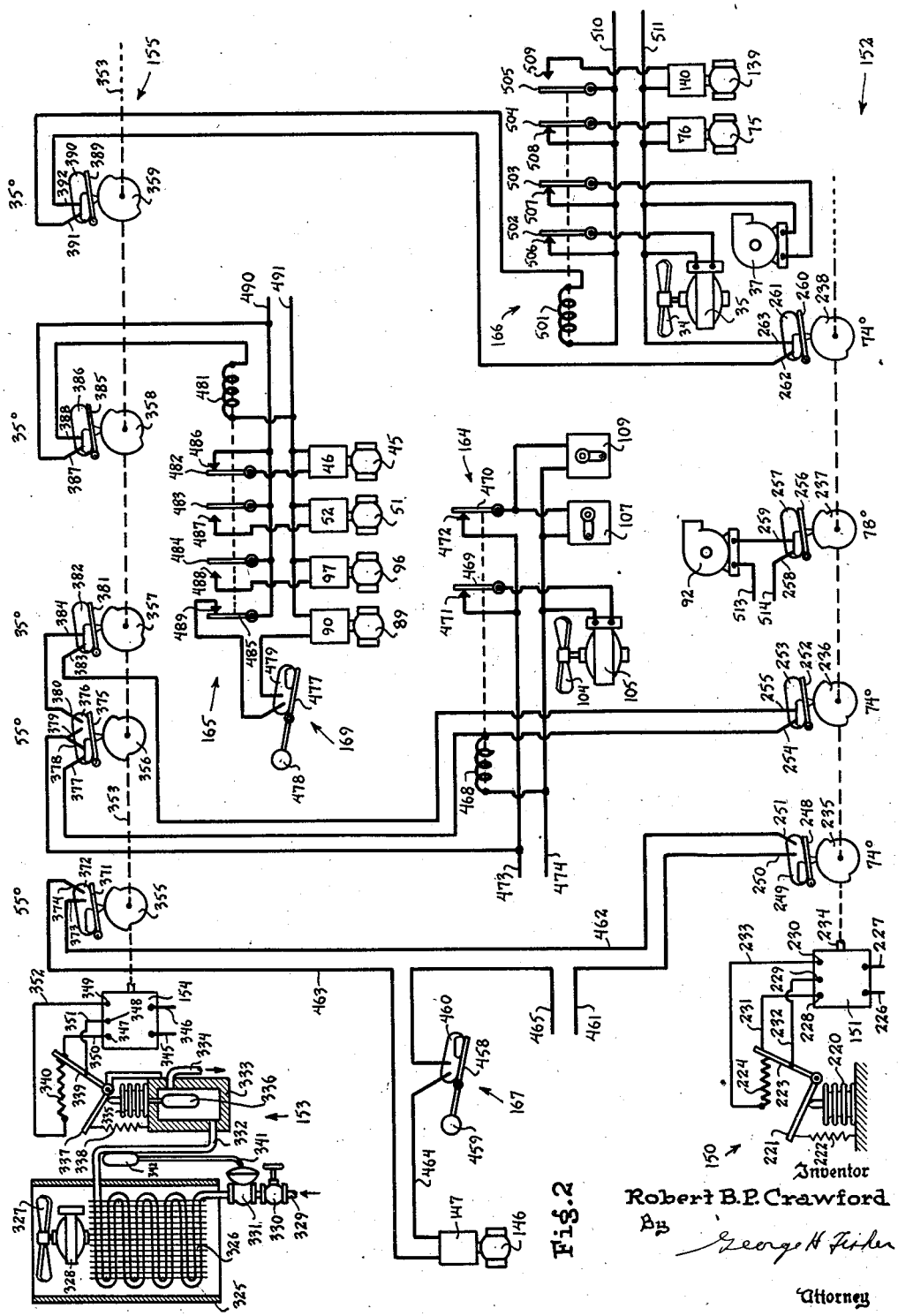
Figure 3:
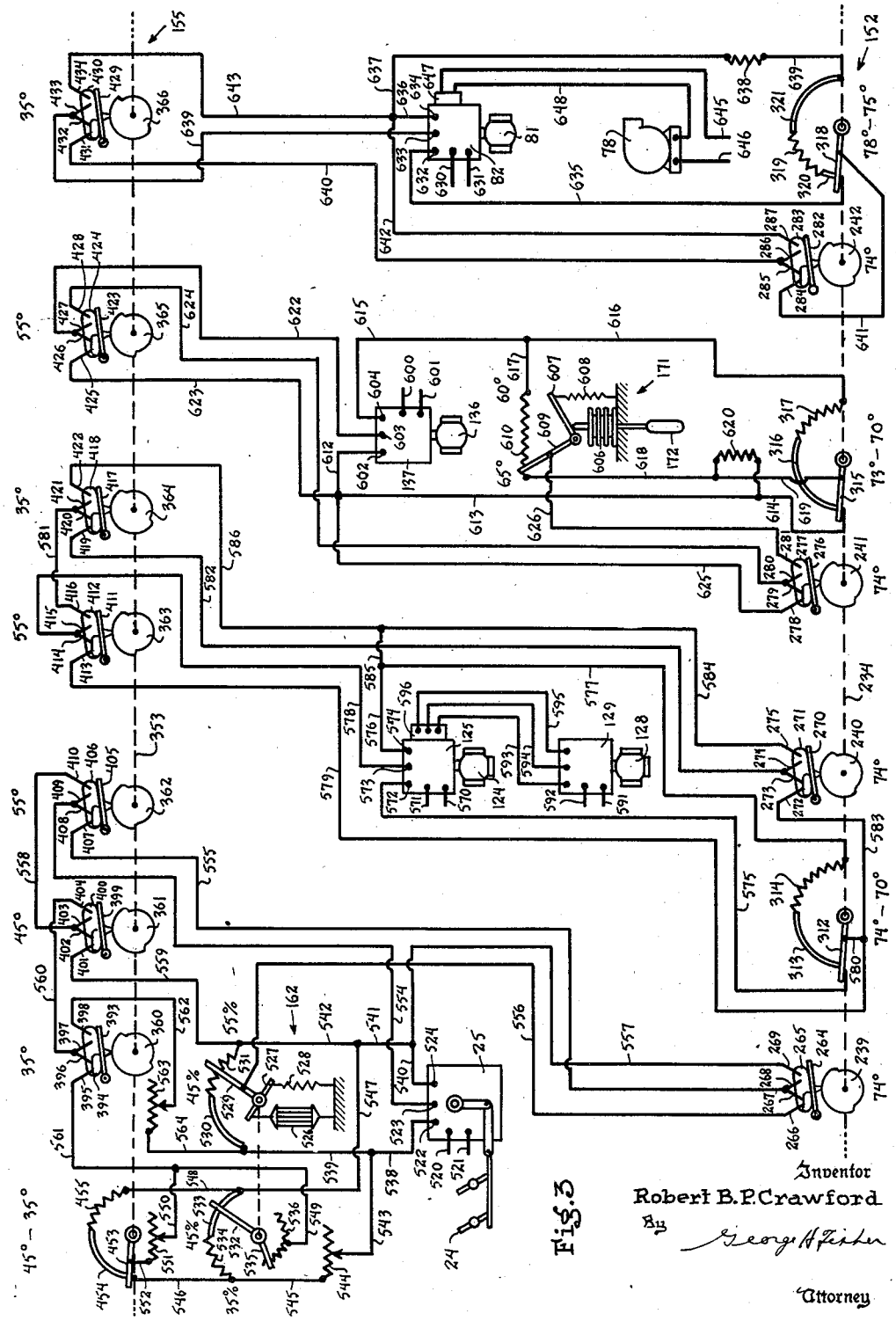
Figure 4:
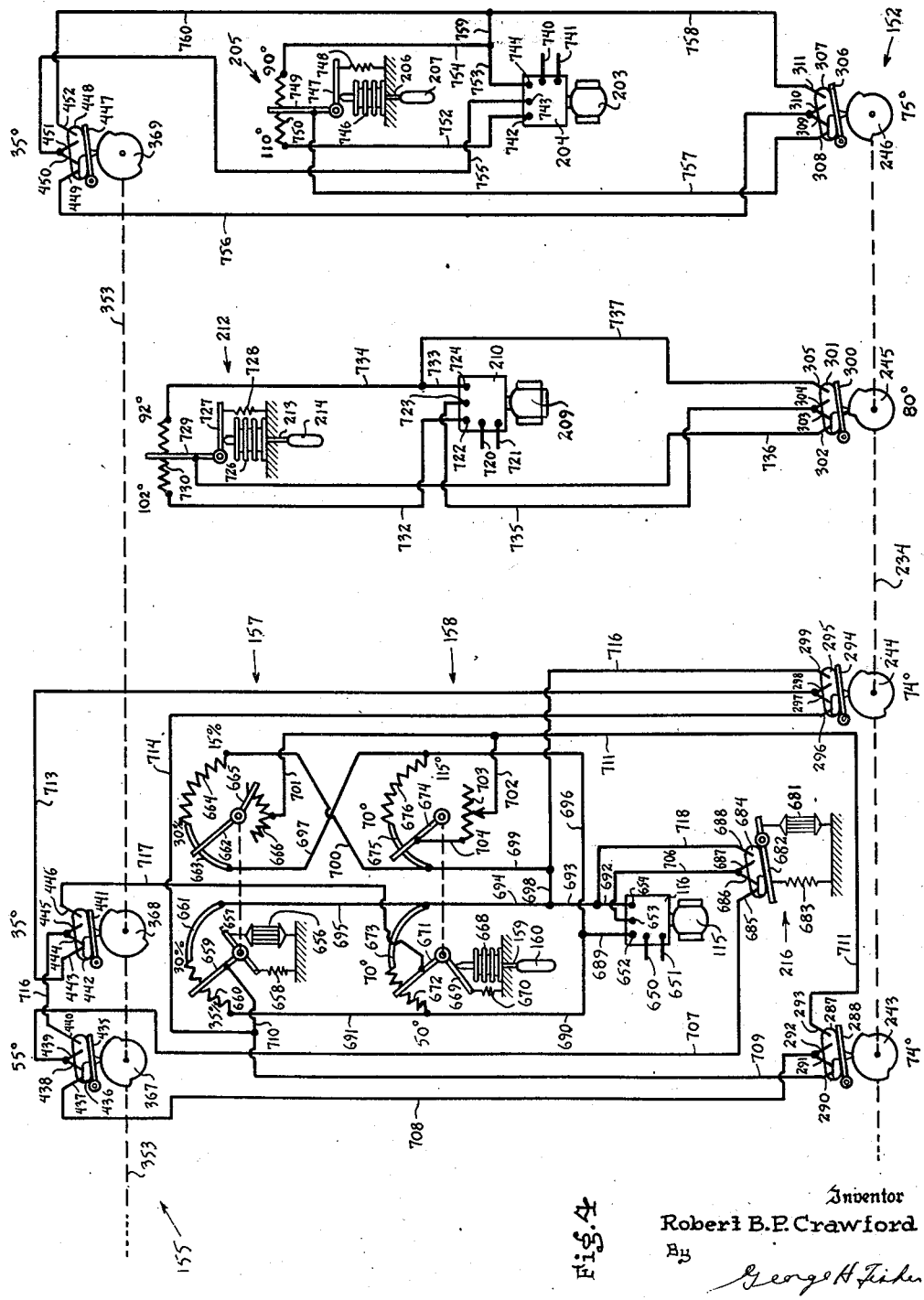

Other objects and advantages will become apparent to those skilled in the art upon reference to the accompanying specification, claims, and drawings, in which:

Figure 1 is a diagrammatic illustration of the air conditioning system of this invention with the automatic controls applied thereto, Figures 2, 3, and 4 illustrate diagrammatically the structure and sequence of operation of the automatic controls utilized in Figure 1.

Figure 5:
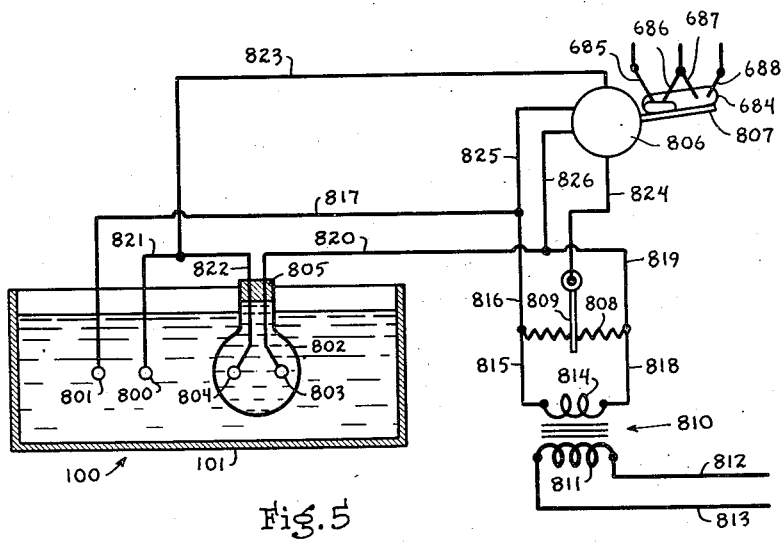
Figure 6:
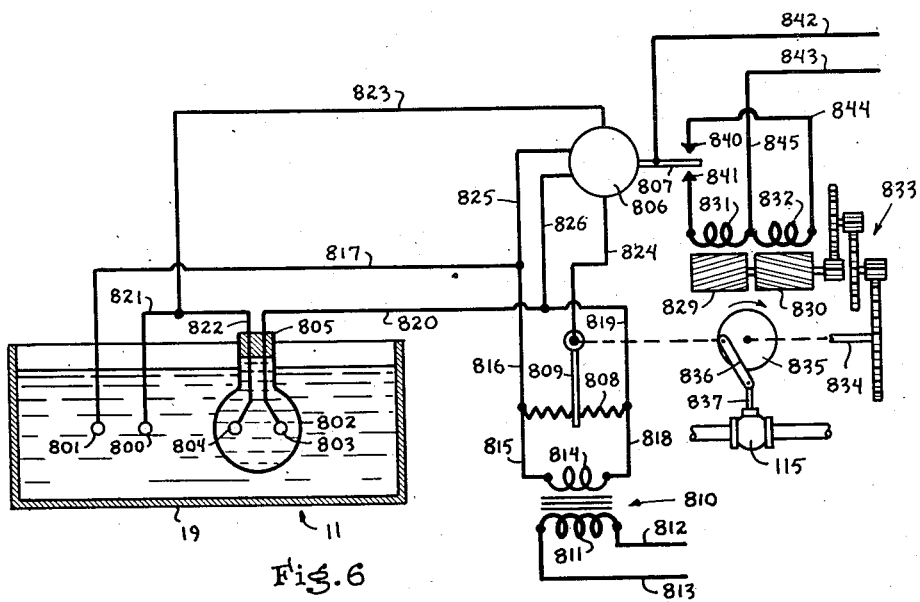

Figures 5 and 6 diagrammatically illustrate various manners in which the concentration of the hygroscopic fluid may be controlled.

Referring now to Figure 1, an enclosure in the form of a space or building, the temperature and relative humidity of which is to be controlled, is designated at 10. The air within the space 10 is conditioned by an air conditioning unit generally designated at 11. This air conditioning unit 11 may be provided with a fresh air inlet duct 12 which in turn may be provided with fresh air dampers 13 and a filter 14. The fresh air drawn through the fresh air inlet 12 passes through a unit which dehumidifies or humidifies the fresh air and is shown to comprise a spray 15, cooling coils 16 and 17, and a spray 18. A sump 19 provided with a baffle or weir 20 is utilized for collecting hygroscopic fluid, such as calcium chloride, lithium chloride, zinc chloride, etc., emanating from the sprays 15 and 18. This unit, which will be termed herein as a dehumidifying unit, is utilized for the purpose of reducing the absolute humidity of the outdoor air entering through the fresh air inlet 12 when dehumidification is required to the desired point so that a desired relative humidity condition may be maintained within the space or building 10. The dehumidifying unit reduces the moisture content of the air entering through the inlet 12 by chemical absorption, that is, the vapor pressure of the saline solution or other hygroscopic fluid circulating out of sprays 15 and 18 in sequence is below the vapor pressure of the air passing these points resulting in a condensation of moisture and an approach toward equalization of the vapor pressures. The vapor pressure of the hygroscopic fluid passing out of the sprays 15 and 18, respectively, and over coils 16 and 17 is controlled by the concentration and temperature of the solution at these points. The cooling coils 16 and 17 are kept at the proper temperature by means of a source of cooling fluid to cool the hygroscopic fluid for dehumidification purposes.

A return air duct 23 provided with a damper 24 operated by a proportioning motor 25 supplies return air from the space or building 10 to the air conditioning unit 11. The return air and the fresh air are mixed and passed through temperature changing coils 26 which operate to cool or heat the air. A fan 27 operated by a motor 28 draws the air through the air conditioning unit 11 and discharges the air at desired temperature and relative humidity conditions through a discharge duct 29 to the space or building 10.

Cooling fluid for the coils 16 and 17 in the dehumidifying unit may be provided by means of a cooling tower generally designated at 30. This cooling tower 30 may comprise a casing 31 provided with an air inlet 32 and an air outlet 33. A fan 34 driven by an electric motor 35 circulates air through the inlet 32, the chamber 31, and the outlet 33. A spray 36 sprays water to be cooled into the chamber 31 and the water so sprayed contacts the air passing through the chamber 31 and is cooled by evaporation. An electrically operated pump 37 withdraws water from the coil 16 through pipe 38 and discharges this water through pipe 39 and spray 36 into the chamber 31. The water cooled by evaporation is collected in the lower part of the chamber 31 and passes through a pipe 40 into the coil 17. The coils 17 and 16 are connected together by a pipe 41 to provide a complete cool water circulating system. Accordingly cool water is supplied from the cooling tower 30 through the coils 17 and 16 and is returned by the pump 37 to the cooling tower to be cooled. It is here noted that the coils 17 and 16 are arranged in counter-flow relation with the fresh air so that the maximum amount of cooling is obtained.

A valve 42 operated by a float 43 supplies make-up water through a pipe 44 from any suitable source of water (not shown) to the cooling tower 30 to make up the water lost by evaporation therein. A valve 45 operated by an electric motor 46 may be utilized to close off the supply of make-up water to the cooling tower 30 when it is desired to shut down this portion of the system. A valve 47 may be located in the pipe 40 leading from the cooling tower 30 to the cooling coil 17 to control the rate of flow of cool water from the tower to the coil 17. This valve may be thermostatically operated by means of a motor 48 connected by a capillary tube 49 to a bulb 50 containing a volatile fluid and located in heat exchange relation with the pipe 38. As the temperature of the water in the pipe 38 increases the valve 47 is moved toward the open position to increase the rate of flow of cooling fluid to the coils 16 and 17. Likewise as the temperature decreases indicating that the load is relatively light the valve 47 is moved towards a closed position to decrease the rate of flow of cooling fluid to the coils 16 and 17. Accordingly the thermostatically controlled valve 47 operates to control this portion of the system in the most economical manner and to maintain the temperature of the coils 16 and 17 at desired values. A valve 51 operated by an electric motor 52 is utilized for draining the water from the cooling tower 30 and coils 16 and 17 through a drain 53. When the valve 51 is opened, the valve 45 in the make up water supply line is closed and all the water in the cooling tower system drains out through the drain 53. This prevents freezing up of this portion of the system in the winter-time.

For cooling purposes the coils 26 are supplied with chilled water for cooling the mixture of fresh air and the return air before it is delivered to the space or building 10. The water supplied to the coils 26 is chilled by an evaporator-absorber arrangement generally designated at 54. This evaporator-absorber arrangement 54 may comprise a vacuum absorber including a chamber 55 and an evaporator including a chamber 56, the two chambers 55 and 56 being connected together by a passage 57. The hygroscopic fluid passes from the sump 19 of the dehumidifier unit through a pipe 58 and is sprayed by a nozzle 59 into the vacuum absorber chamber 55. A pump 60 withdraws the hygroscopic fluid from the bottom of the chamber 55 through a pipe 61 and discharges this hygroscopic fluid through a pipe 62, a valve 63, and a pipe 64 to the spray 15. The hygroscopic fluid from the spray 15 is collected in the sump 19 on the left-hand side of the weir 20 and is then withdrawn from the sump by means of a pump 65 through pipe 66 and is supplied to spray 18 through a pipe 67. The hygroscopic fluid from the spray 18 is collected in the sump on the right-hand side of the weir 20. Accordingly a complete circulating system for the hygroscopic fluid is provided for supplying the sprays 15 and 18 with hygroscopic fluid to dehumidify the air entering the fresh air inlet 12 and for supplying hygroscopic fluid to the evaporator-absorber arrangement 54 for cooling the water passing through the cooling coils 26. The cooling coil 17 is provided with an extension 17' for further cooling the hygroscopic fluid in the sump on the right hand side of the weir 20 so that relatively cool hygroscopic fluid is supplied to the evaporator-absorber arrangement 54. Some of the hygroscopic fluid flowing from the vacuum absorber chamber 55 passes through a valve 68 and a pipe 69 to a concentrator, the structure and operation of which will be pointed out more fully hereafter. Preferably the valves 68 and 63 are so adjusted that about five-sixths of the hygroscopic fluid delivered by the pump 60 passes through valve 63 to spray 15 and about one-sixth passes through valve 68 to the concentrator. Concentrated hygroscopic fluid is supplied from the concentrator through pipe 70 by a pump 71 to the sump 19 of the dehumidifier unit. By reason of this supplying of concentrated hygroscopic fluid to the dehumidifier unit, the concentration of the hygroscopic fluid delivered by the sprays 16 and 17 is maintained at the desired value to perform the correct amount of dehumidification.

A heat exchanger 200 may be located in the pipe 70 which delivers concentrated hygroscopic fluid to the sump 19 for cooling the hygroscopic fluid and this heat exchanger may receive its cooling fluid from pipe 39 on the discharge side of the pump 37 through pipes 201 and 202 under the control of a valve 203 operated by an electric proportioning motor 204. The motor 204 is controlled by a temperature responsive controller 205 connected by a capillary tube 206 to a bulb 207 containing a volatile fluid and responsive to the temperature of the hygroscopic fluid leaving the heat exchanger 200. Upon an increase in temperature the valve 203 is moved towards a closed position to cause more of the cool water leaving the pump 37 to flow through the heat exchanger 200 for cooling the hygroscopic fluid. In this manner the valve 203 is operated to maintain the temperature of the concentrated hygroscopic fluid delivered to the sump 19 at desired values.

A three-way valve 209 located in the pipe 70 between the heat exchanger 200 and the sump 19 and operated by an electric proportioning motor 210 may be utilized to by-pass some of the concentrated hygroscopic fluid through a pipe 211 directly to the nozzle 59 of the vacuum absorber chamber 55 to increase the cooling action thereof during peak sensible cooling load periods. The proportioning motor 210 and hence the valve 209 may be controlled by a temperature responsive controller 212 connected by a capillary tube 213 to a bulb 214 containing a volatile fluid and responsive to the temperature of the hygroscopic solution leaving the vacuum absorber chamber 55 through pipe 61. With a constant flow of hygroscopic fluid through the nozzle 59, a rise in temperature of the hygroscopic fluid in the vacuum absorber chamber 55 is directly proportional to the amount of evaporation in the evaporator chamber 56 and hence to the amount of sensible cooling done by the coils 26. Since the temperature of the hygroscopic fluid leaving the vacuum absorber chamber 55 varies with the sensible cooling load, the three-way valve 209 is positioned in accordance with changes in the sensible cooling load.

Water flows from the temperature changing coils 26 through pipes 73 and 74 under the control of a valve 75 operated by a motor 76 to a nozzle 77 located in the evaporator chamber 56. When the valve 75 is open, water is sprayed into the evaporator chamber 56. As pointed out above the evaporator chamber 56 is connected by the passage 57 to the vacuum absorber chamber 55 and since the hygroscopic solution sprayed by the nozzle 59 into the vacuum absorber chamber 55 is of lower vapor pressure than the vapor pressure of the water sprayed into the evaporator chamber 56 by nozzle 77, some of the water sprayed into the evaporator chamber 56 evaporates and cools the remainder of the water therein to the desired degree. In other words, some of the water emanating from nozzle 77 is evaporated to cool the remainder of the water, this evaporation being caused by the absorption of water vapor by the hygroscopic fluid of lower vapor pressure spraying from nozzle 59 into the vacuum absorber chamber 55. In order to reduce air friction in the movement of the water vapor molecules from the chamber 56 to the chamber 55 a vacuum is produced in the evaporator-absorber arrangement 54 by means of an electrically operated vacuum pump 92 which is connected to the chamber 56 by a pipe 93. The vacuum pump 92 draws air out of the evaporator-absorber arrangement and discharges this air against atmospheric pressure on the discharge side of the pump. While the maximum capacity of the evaporator-absorber arrangement is reached when the absolute pressure in the chambers 55 and 56 is equal to or slightly below the vapor pressure of the hygroscopic solution delivered at the nozzle 59 which is normally about six millimeters of mercury, the evaporation will continue at any pressure at a more reduced capacity for higher absolute pressures. Accordingly by controlling the operation of the vacuum pump 92 the cooling capacity of the evaporator-absorber arrangement 54 may be varied. A check valve 94 located in the pipe 93 between the chamber 56 and the pump 92 is utilized for preventing the back flow of air into the chamber 56 when the vacuum pump 92 is not operating.

Chilled water is collected at the bottom of the evaporator chamber 56 and is withdrawn by an electrically operated pump 78 through a pipe 79 and is discharged through a pipe 80, valve 81 controlled by an electric proportioning motor 82, pipe 83, manually operated valve 84, and pipes 85 and 86 to the temperature changing coils 26. Accordingly a complete circulating system for the water flowing through the temperature changing coils 26 is obtained provided the valves 81, 84, and 75 are opened. Make up water for this cooling system is supplied to the evaporator chamber 56 through a nozzle 87 from a source of water 88 under the control of a valve 89 operated by an electric motor 90. Accordingly when the valve 89 is opened, make up water is supplied to this portion of the system. Preferably the two nozzles 77 and 87 are so arranged that the upper nozzle discharges the warmer water so as to get the advantage of the biggest differential in vapor pressure between these water sprays and the hygroscopic solution spray emanating from nozzle 59. For example if the make up water is usually warmer than the return water, nozzle 87 would be located above nozzle 77, as shown. If, however, the temperature of the make up water is lower than that of the return water, the nozzle 87 is located below the nozzle 77. When it is desired to drain this portion of the system a valve 96 operated by a motor 97 may be opened to drain the water through a drain 98. When valve 96 is opened for draining purposes, make up water valve 89 is closed to prevent the supply of make up water to the evaporator chamber 56.

A concentrator for concentrating the hygroscopic solution supplied to the dehumidifier unit is generally designated at 100 and this concentrator may comprise a casing 101 provided with an air inlet 102 and an air outlet 103. A fan 104 operated by an electric motor 105 circulates air through the inlet 102, the chamber 101 and the outlet 103. The air inlet is controlled by a damper 106 operated by an electric motor 107 and the air outlet 103 is controlled by a damper 108 operated by an electric motor 109. A spray 110 located in the chamber 101 sprays the relatively weak hygroscopic fluid over a heating coil 111 which drives off the moisture from the hygroscopic solution thereby concentrating the same. The moisture is carried out of the chamber 101 by the fan 104. The concentrated hygroscopic fluid is collected in the bottom of chamber 101. If desired suitable contacting arrangements such as carbon rings, etc., may be located below the heating coil 111 to cause the heated hygroscopic fluid to become more intimately contacted by the air passing through the chamber 101. A pipe 113 leads to a source of steam (not shown) and is connected by a pipe 114 and a valve 115 operated by an electric proportioning motor 116 to the steam coil 111. When the valve 115 is opened steam is supplied to the coil 111 to increase the concentration of the hygroscopic fluid by driving moisture therefrom. Condensed steam passes through a trap 117 and a pipe 118 to a condensate line 119.

A heat exchanger for causing heat exchange between the warm concentrated hygroscopic fluid flowing from the concentrator 100 and the cool dilute hygroscopic fluid flowing from the evaporator-absorber arrangement 54 is designated at 122. The dilute solution passes through the pipe 69, heat exchanger 122, pipe 123, three-way valve 124 operated by an electric proportioning motor 125 and pipe 126 to the spray 110. Concentrated solution flows from the chamber 101 through pipe 127, three-way valve 128 operated by an electric proportioning motor 129, pipe 130, heat exchanger 122, and pipe 70 to the dehumidifying unit and this concentrated solution may be circulated by a pump 71. By causing heat exchange between the two fluids in the heat exchanger 122, economy of operation is greatly increased and the hot concentrated solution is precooled. Under certain conditions, as in the winter-time, it is not desirable to have this heat exchange relation and therefore pipes 131 and 132 connected around the heat exchanger 122 to the three-way valves 124 and 128, respectively, are utilized. The purpose of this will be pointed out more fully hereafter.

At certain times, as in the winter-time, it is desirable that the coils 26 in the air conditioning unit 11 perform a heating function instead of a cooling function and to accomplish this steam is supplied to the coils 26 from the steam pipe 113 through pipe 135, valve 136 operated by an electric proportioning motor 137, manual valve 138, and pipe 86. Condensate is withdrawn from the coils 26 through valve 139 operated by an electric motor 140 and trap 141 to the condensate line 119. Accordingly when the valves 136, 138, and 139 are opened steam is supplied to the coils 26 for heating purposes. At this time valves 75 and 81 are closed so that cooling fluid cannot be simultaneously supplied. The manual valves 84 and 138 are not necessary but they may be utilized to prevent absolutely the supply of steam to the coils 26 in the summertime and the supply of chilled water to the coils 26 in the winter-time.

At certain times, as in the winter-time, it is desirable that the sprays 15 and 19 in the dehumidifier unit perform a humidifying function instead of a dehumidifying function as in summer. In other words, it is desirable that these sprays give up moisture to the air passing therethrough instead of withdrawing moisture therefrom. A pipe 145 leading from the source of water 44 and controlled by a valve 146 operated by an electric motor 147 supplies water to the sprays 15 and 18 to make up for the water given off thereby to the air passing through the fresh air inlet 12 in the winter.

Thermostat 150 responds to the dry bulb temperature of the space or building 10 and for purposes of illustration it is assumed that this thermostat controls between 70° and 80°. The thermostat 150 controls the operation of a proportioning motor 151 which in turn operates a step controller 152. A dew-point controller 153 responsive to the dew-point temperature of the air outside of the building positions a proportioning motor 154 which in turn operates a step controller 155. For purposes of illustration it is assumed that the dew-point controller 153 controls between outside dew-point temperatures of 80° and 33°.

When the outside dew-point temperature is above 35° a relay 165 is pulled in by the step controller 155 and this relay controls the operation of valves 45, 51, 96 and 89. When the relay is pulled in the valve 45 controlling the supply of make up water to the cooling tower 30 is opened so that the float operated valve 42 may maintain the correct amount of water in the cooling tower circuit. In addition when the relay 165 is pulled in the valve 51 which drains the cooling tower circuit and the valve 96 which drains the chilled water circuit are closed and the valve 89 which controls the supply of make up water to the chilled water circuit is under the control of a liquid level controller 169 to maintain the correct amount of water in the chilled water circuit. When the outdoor dew-point temperature decreases below 35° the relay 165 drops out to close the make up water valve 45 of the cooling tower circuit and to close the make up water valve 89 of the chilled water circuit to prevent the further supply of water to these two circuits. Dropping out of the relay 165 also opens the valves 51 and 96 to drain the cooling water out of the cooling water circuit and to drain the chilled water out of the chilled water circuit. This prevents freezing up of this portion of the air conditioning system during the winter-time.

When the outside dew-point temperature is above 35° and the enclosure dry bulb temperature is above 74°, a relay 166 is pulled in by the step controllers 152 and 155. This relay when pulled in causes operation of the cooling tower fan 34 and the cooling water circuit pump 37. Also when this relay is pulled in the valve 75 in the chilled water circuit is open and the valve 139 in the steam circuit is closed. When either the outside dew-point temperature drops below 35° or the enclosure dry bulb temperature drops below 74° the cooling tower fan 34 and the cooling tower pump 37 are shut off, the valve 75 is closed and the valve 139 is opened.

When the outside dew-point temperature is above 55° the step controller 155 pulls in a relay 164 or when the outside dew-point temperature is between 55° and 35° and the enclosure dry bulb temperature is above 74°, the step controllers 152 and 155 pull in the relay 164. When the relay 164 is pulled in, the dampers 106 and 108 of the concentrator 100 are open and the fan 104 is in operation so that the concentrator 100 drives off moisture from the hygroscopic fluid, the moisture being carried out of the concentrator 100 by the fan 104. When either the outside dew-point temperature falls below 35°, or the enclosure dry bulb temperature falls below 74° providing the outside dew-point temperature is not above 55°, this indicates that cooling or dehumidification is not necessary. Under these conditions the fan 104 of the concentrator 100 is shut off and the dampers 106 and 108 of the concentrator 100 are closed whereupon moisture is not taken out of the hygroscopic fluid in the concentrator 100.

The valve 146 which controls the supply of make up water to the sump 19 is closed when either the outside dew-point temperature is above 55° or the enclosure temperature is above 74°. When both the outside dew-point temperature falls below 55° and the enclosure dry bulb temperature falls below 74° the valve 146 is placed under the control of the liquid level controller 167 to maintain the level of the hygroscopic fluid in the sump 19 at a substantially constant value.

In the summertime when the outside dew-point temperature is above 55° and the building temperature is relatively high, say above 74°, it is desirable not only to maintain the relative humidity of the dehumidified fresh air at a desired low value but it is also desirable to maintain this dehumidified fresh air at the lowest possible temperature to afford some sensible cooling within the building. Accordingly under these conditions the three-way valves 124 and 128 are positioned by the step controllers 152 and 155 to pass the hygroscopic fluid of relatively high concentration through the heat exchanger 122 so that the temperature of the hygroscopic fluid entering the dehumidifying unit will be relatively low. If now the outdoor dew-point temperature should be above 55° and it should be a rainy or damp day whereupon the temperature within the building would tend to decrease, it may be desirable to increase the temperature of the hygroscopic fluid of relatively high concentration flowing to the dehumidifying unit so that some heating may be obtained from this relatively warm hygroscopic fluid. Accordingly when the outside dew-point temperature is above 55° and the enclosure temperature decreases below 74° the three-way valves 124 and 128 are graduatingly positioned to by-pass graduatingly the heat exchanger 122 as the space temperature decreases. It follows then that as the space temperature decreases, the temperature of the hygroscopic fluid delivered to the dehumidifying unit is increased to supply heat to the space to give the occupants of the space a feeling of dry warmth on these rainy or damp days. When the outside dew-point temperature falls below 55° but remains above 35° and the enclosure dry bulb temperature is above 74° indicating that cooling of the enclosure is required, the three-way valves 124 and 128 are positioned to cause the hygroscopic fluid of relatively high concentration to flow through the heat exchanger 122 so that the maximum amount of cooling may be obtained by the evaporator absorber arrangement 54. If when the outside dew-point temperature is between 55° and 35° and the enclosure dry bulb temperature falls below 74° indicating that no sensible cooling is necessary, or if the outside dew-point temperature should fall below 35° indicating that no dehumidification or sensible cooling is required, the heat exchanger 122 is entirely by-passed so that relatively warm hygroscopic fluid is delivered to the dehumidifying unit for preheating and under certain circumstances for humidifying the fresh air.

The steam valve 115 which controls the supply of steam to the concentrator 100 is controlled by the step controller 152 and the step controller 155. In addition the steam valve 115 is also controlled by a relative humidity responsive controller 157 located in the fresh air stream on the discharge side of the dehumidifying unit, by a temperature responsive controller 158 connected by a capillary tube 159 to a bulb 160 also located in the fresh air stream on the discharge side of the dehumidifying unit and by a humidity responsive controller 216 located in the air being discharged from the concentrator 100.

When the outside dew-point temperature is above 55° and the space temperature is above 74°, the steam valve 115 is placed under the control of the relative humidity controller 157 to maintain the relative humidity of the fresh air entering the air conditioning unit between 30% and 35%. Upon an increase in relative humidity of the fresh air entering the air conditioning unit the humidity controller 157 moves the valve 115 toward an open position to increase the concentration of the hygroscopic fluid in the dehumidifying unit to reduce the relative humidity of the air. Conversely upon a decrease in relative humidity the humidity controller 157 moves the valve 115 towards a closed position to decrease the concentration of the hygroscopic fluid in the dehumidifying unit to allow the relative humidity to increase. Accordingly, when the outside dew-point temperature is above 55° and the space dry bulb temperature is above 74° the humidity responsive controller 157 operates to maintain the relative humidity of the air leaving the dehumidifying unit between 30% and 35%.

If now the outside dew-point temperature is above 55° and the space temperature decreases below 74° which would be caused by a rainy or damp day, the valve 115 is placed under the control of both the relative humidity responsive controller 157 and the temperature responsive controller 158. As pointed out above under these conditions the temperature of the hygroscopic fluid delivered to the dehumidifying unit is increased to supply heat to the space. This therefore causes the temperature of the air passing over the humidity controller to increase thereby decreasing the relative humidity of this air. Accordingly it is desirable to decrease the setting of the relative humidity controller 157 as the temperature of the air increases to maintain the moisture content of the air emanating from the dehumidifying unit substantially constant regardless of the increase in temperature. The temperature responsive controller under these conditions therefore compensates or adjusts the relative humidity controller 157 to lower the setting thereof as the temperature increases. For purposes of illustration it is assumed that when the temperature of the air is 70° the relative humidity is maintained at substantially 30% and as the temperature increases from 70° to 115° the relative humidity of the air is decreased from 30% to 15% thereby maintaining the moisture content of the air substantially constant regardless of the temperature of the air. In this manner not only is the moisture content of the fresh air maintained substantially constant for dehumidification purposes but heat is supplied to the fresh air by the dehumidifying unit when needed.

When the outside dew-point temperature falls to a value between 55° and 35° and the enclosure dry bulb temperature is above 74°, the steam valve 115 is placed under the control of the humidity responsive controller 157 to maintain the relative humidity of the air entering the air conditioning unit between 30% and 35%. In other words, concentrated hygroscopic fluid is supplied to the sump 19 of the dehumidifying unit which in turn is delivered to the evaporator-absorber arrangement 54 for providing sensible cooling. If the outside dew-point temperature be between 55° and 35° and the enclosure temperature falls below 74° the steam valve 115 is closed so that concentration of the hygroscopic fluid is prevented at this time.

When the outside dew-point temperature drops below 35°, the steam valve 115 is placed under the control of the temperature responsive controller 158 to maintain the temperature of the fresh air entering the air conditioning unit 11 between 50° and 70° depending upon the heating load on the system. As the temperature of the fresh air leaving the sprays 15 and 18 increases the valve 115 is moved towards a closed position to decrease the temperature of the sprays and as the temperature of the air decreases the valve 115 is moved towards an open position to increase the temperature of the sprays. As the temperature of the hygroscopic fluid decreases, the sprays give up less moisture to the air and as the temperature increases the sprays give up more moisture. Accordingly when the outside temperature is relatively high, say 40°, the temperature responsive controller 158 tends to maintain the temperature of the fresh air leaving the sprays at substantially 70° with a fairly high relative humidity. As the outside temperature decreases, the control point of the temperature responsive controller 158 drops so that when the outside temperature is at, say 0°, the temperature of the fresh air leaving the sprays is maintained at substantially 50° with a smaller amount of moisture contained therein. With such an arrangement as the outside temperature decreases, the moisture content of the fresh air leaving the sprays decreases to decrease the moisture content of the air in the space 10. Frosting of the windows and condensation of moisture on the outside walls of the enclosure is therefore prevented.

Valve 203 which controls the flow of cooling water through the heat exchanger 200 for cooling the hygroscopic fluid of relatively high concentration in addition to being controlled by the temperature responsive controller 205 is controlled by the step controllers 152 and 155. When the outside dew-point temperature is above 35° and the enclosure dry bulb temperature is above 75°, the valve 203 is placed under the control of the temperature responsive controller 205 to maintain the temperature of the hygroscopic fluid of relatively high concentration between 90° and 110° for calcium chloride or between 120° and 140° for lithium chloride and zinc chloride and similar solutions of low aqueous vapor pressure. As the temperature of the hygroscopic fluid increases, the valve 203 is moved towards a closed position to cause more of the cool water to flow through the heat exchanger 200 to cool the hygroscopic fluid and conversely as the temperature of the hygroscopic fluid decreases, the valve 203 is moved towards an open position to by-pass more of the cool water around the heat exchanger 200. If now the outside dew-point temperature falls below 35° or the enclosure dry bulb temperature falls below 75°, it is not desirable to precool the hygroscopic fluid since under these conditions this hygroscopic fluid is utilized for heating purposes. Accordingly the step controllers 152 and 155 open the valve 203 to completely by-pass the heat exchanger 200 under these conditions.

If during the summertime the sensible cooling load within the enclosure should become extremely high, say above 80°, the step controller 152 places the control of the three-way valve 209 under the control of the temperature responsive controller 212. The temperature responsive controller 212 graduatingly positions the three-way valve 209 in accordance with the temperature of the hygroscopic fluid leaving the evaporator-absorber arrangement 54, this temperature being an indication of the sensible cooling load within the enclosure 10. As the temperature of the hygroscopic fluid increases due to an increase in sensible cooling load, the valve 209 is positioned to cause some of the hygroscopic fluid of relatively high concentration to flow through the pipe 211 directly to the nozzle 59 in the evaporator-absorber arrangement 54 to increase the cooling effect thereof. If calcium chloride be used the valve 209 would start to supply hygroscopic fluid to the nozzle 59 at 92° and would supply the full amount at 102° while for lithium chloride the valve would be opened gradually as the temperature increases from 110° to 130°. For zinc chloride the valve would gradually open as the temperature increases from 120° to 140°. Any hygroscopic solution chosen would thus have definite temperature values. Accordingly hygroscopic fluid of relatively high concentration is admitted directly to the nozzle 59 of the evaporator-absorber arrangement in accordance with the sensible cooling load when the dry bulb temperature of the enclosure rises above 80°. When the dry bulb temperature within the enclosure is below 80° the valve 209 is positioned to cause all of the highly concentrated hygroscopic fluid to flow directly to the sump 19.

When the enclosure dry bulb temperature is above 78°, the vacuum pump 92 is maintained in operation by the step controller 152 to increase the cooling capacity of the evaporator-absorber arrangement 54. As soon as the enclosure dry bulb temperature drops below 78° the bulb 92 is shut off to decrease the cooling capacity of the evaporator-absorber arrangement 54. In this manner the cooling capacity of the evaporator absorber and hence the temperature within the enclosure is controlled by the step controller 152.

When the outside dew-point temperature is above 35° the step controller 155 places the control of the chilled water throttling valve 81 under the control of the step controller 152 operated in accordance with variations in enclosure dry bulb temperature. As the enclosure dry bulb temperature decreases from 78° to 75° the throttling valve 81 is moved from an open position towards a minimum position to throttle the flow of chilled water and hence decrease the cooling capacity of the coils 26. When the valve 81 is moved to the minimum position the pump 78 in the chilled water circuit is shut off. In this manner the cooling action of the cooling coils 26 is modulatingly controlled in accordance with variations in enclosure dry bulb temperature when the outside dew-point temperature is above 35°. When the outside dew-point temperature falls below 35° or the enclosure dry bulb temperature drops below 74° the throttling valve 81 is completely closed and the pump 78 is stopped since the system operates on a heating cycle under these conditions.

The steam valve 136 which controls the supply of steam to the coils 26 is controlled by the step controllers 152 and 155 and by a discharge temperature limit control 171 suitably connected by a capillary tube to a bulb 172 located in the discharge duct 29. When the outside dew-point temperature is above 55° the step controller 155 maintains the steam valve 136 closed since no heating is desired at this time by the coils 26. When the outside dew-point temperature falls below 55° the steam valve 136 is placed under the control of the step controller 152. When the temperature of the enclosure is above 74° the step controller 152 maintains the steam valve 136 closed and when the enclosure temperature decreases from 73° to 70° the steam valve 136 is graduatingly positioned towards an open position to increase the heating effect of the coils 26. The discharge temperature limit controller 171 operates in conjunction with the step controller 152 to prevent cold drafts in the enclosure 10 when the enclosure temperature is below 74°. In this manner desired dry bulb temperatures are maintained within the enclosure 10 in the winter-time.

The return air damper 24 is controlled by a relative humidity responsive controller 162 located in the enclosure 10 and by the step controllers 152 and 155. When the outside dew-point temperature is above 55° and the enclosure dry-bulb temperature is above 74°, the damper 24 is placed under the control of the enclosure relative humidity controller 162 to maintain the relative humidity within the enclosure between 45% and 55%. If the dry bulb temperature within the enclosure should drop below 74° the return air damper 24 is closed so that warm, dehumidified fresh air is utilized for conditioning the enclosure. If the outdoor dew-point temperature decreases below 55° but remains above 45° the return air damper 24 is also closed to supply fresh air for ventilation purposes. If the outside dew-point temperature decreases below 45° but remains above 35° the damper 24 is placed under the control of the relative humidity controller 162 to maintain the relative humidity within the enclosure, between 35% and 45%. At this time the relative humidity controller 162 is adjusted or compensated by the step controller 152 to lower the setting of the humidity responsive controller as the outside dew-point temperature decreases. In other words, when the outside dew-point temperature is substantially 45° the control point of the relative humidity responsive controller 152 will be substantially 45% and as the outside dew-point temperature decreases to 35° the setting of the relative humidity responsive controller 162 is lowered to 35%. Accordingly as the outside dew-point temperature decreases the relative humidity within the enclosure 10 is decreased to prevent condensation of moisture on the windows and outside walls. When the outside dew-point temperature falls below 35° the return air damper 24 is moved to the three-quarter open position so that substantially all return air is utilized for conditioning purposes. Under these conditions only above 25% fresh air is utilized. Only the return air damper 24 is shown to be automatically controlled since there is sufficient air resistance in the dehumidifier unit that the fresh air supply will vary inversely with the return air supply. Obviously the fresh air damper 13 could also be automatically operated with the return air damper 24 to assure the proper relation between fresh and return air.

While the cooling coils 16 and 17 in the dehumidifier unit 12 essentially removed the heat of dehumidification, these cooling coils need not necessarily be in the direct path of the spray of hygroscopic fluid but may be installed downstream beyond the sprays 15 and 18 to act as after-cooling coils. When this type of system is used with solutions of great hygroscopic power such as lithium bromide and zinc chloride, such adiabatic dehumidification and after-cooling with the same hygroscopic fluid, water and control circuits disclosed herein allows the use of less circulating water from the cooling tower 30.

It is obvious that well water or city water may be supplied to the cooling coils 16 and 17 instead of cold water from the cooling tower 30, as illustrated, and that the concentrator 100 may also be a vacuum evaporator, a sun pan, a direct fired evaporator, or other known means without departing from the spirit of the control system described herein.

In Figure 1, the various controls are shown to be connected to the instrumentalities controlled thereby by conduits indicated in broken lines but for a more thorough understanding of the control system utilized in this invention reference is made to Figures 2, 3, and 4, Figures 3 and 4 being an extension of Figure 2. The space temperature responsive controller 150 may comprise a bellows 220 containing a volatile fluid for operating a lever 221 against the action of an adjustable tension spring 222. The lever 221 operates a slider 223 with respect to a resistance element 224. Upon a decrease in space temperature the slider 223 is moved to the left and upon an increase in space temperature the slider 223 is moved to the right. For purposes of illustration it is assumed that the slider 223 assumes the position shown when the space temperature is 80° and the slider 223 moves to the left upon a decrease in space temperature until the space temperature has decreased to 70° whereupon the slider 223 assumes an extreme left hand position.

The proportioning motor 151 may be of the type shown and described in Patent No. 2,028,110 granted to D. G. Taylor on January 14, 1936. Power may be supplied to the proportioning motor 151 by means of wires 226 and 227 leading from some source of power (not shown). The proportioning motor 151 may also be provided with control terminals 228, 229, and 230 which are connected by wires 231, 232, and 233, respectively, to the potentiometer of the space temperature responsive controller 150. The series connected relay coils (not shown) contained within the proportioning motor 151 are connected across the control terminals 228 and 230, the junction of these relay coils being connected to the control terminal 229. The proportioning motor 151 operates a shaft 234 forming a part of the step controller 152. As will be apparent from the above referred to Taylor patent, with the temperature responsive controller 150 in the position shown the proportioning motor 151 is in an extreme position and as the temperature progressively decreases to 70° the proportioning motor is progressively operated through substantially 180° of rotation. Since such a construction is well known in the art a further description is not considered necessary.

The shaft 234 which is operated by the proportioning motor 151 and which forms part of the step controller 152 operates cams 235 through 246, inclusive. Cam 235 operates an arm 248 which in turn operates a mercury switch 249 having electrodes 250 and 251. When the temperature within the enclosure decreases below 74° the switch 249 is operated to cause the mercury therein to bridge the electrodes 250 and 251. The cam 236 operates an arm 252 which in turn operates a mercury switch 253 having electrodes 254 and 255. When the temperature within the enclosure falls below 74° the switch 253 is tilted to unbridge the electrodes 254 and 255. The cam 237 operates an arm 256 which in turn operates a mercury switch 257 having electrodes 258 and 259. When the temperature within the enclosure falls below 78° the switch 257 is tilted to unbridge the electrodes 258 and 259. The cam 238 operates an arm 260 which in turn operates a mercury switch 261 having electrodes 262 and 263. When the temperature within the enclosure falls below 74° the switch 261 is operated to unbridge the electrodes 262 and 263.

The cam 239 operates a lever 264 which in turn operates a mercury switch 265 having electrodes 266, 267, 268, and 269. When the temperature within the enclosure is above 74° the electrodes 266 and 267 are bridged and when the temperature falls below 74° the electrodes 268 and 269 are bridged. The cam 240 operates an arm 270 which in turn operates a mercury switch 271 having electrodes 272, 273, 274, and 275. When the temperature within the enclosure is above 74° the electrodes 272 and 273 are bridged and when the temperature falls below 74° the electrodes 274 and 275 are bridged. The cam 241 operates an arm 276 which in turn operates a mercury switch 277 having electrodes 278, 279, 280, and 281. When the temperature within the enclosure is above 74° the electrodes 278 and 279 are bridged and when the temperature falls below 74° the electrodes 280 and 281 are bridged. The cam 242 operates an arm 282 which in turn operates a mercury switch 283 having electrodes 284, 285, 286, and 287. When the temperature within the enclosure is above 74° the electrodes 284 and 285 are bridged and when the temperature falls below 74° the electrodes 286 and 287 are bridged.

The cam 243 operates an arm 288 which in turn operates a mercury switch 289 having electrodes 290, 291, 292, and 293. When the temperature within the enclosure is above 74° the electrodes 290 and 291 are bridged and when the temperature falls below 74° the electrodes 292 and 293 are bridged. The cam 244 operates an arm 294 which in turn operates a mercury switch 295 having electrodes 296, 297, 298, and 299. When the temperature within the enclosure is above 74° the electrodes 296 and 297 are bridged and when the temperature falls below 74° the electrodes 298 and 299 are bridged. The cam 245 operates an arm 300 which in turn operates a mercury switch 301 having electrodes 302, 303, 304, and 305. When the temperature within the enclosure is above 80° the electrodes 304 and 305 are bridged. The cam 246 operates an arm 306 which in turn operates a mercury switch 307 having electrodes 308, 309, 310, and 311. When the temperature within the enclosure is above 75° the electrodes 308 and 309 are bridged and when the temperature falls below 75° the electrodes 310 and 311 are bridged.

The shaft 234 of the step controller operates a slider 312 with respect to a conductor 313 and a resistance element 314, the slider 312 and resistance element 314 forming a control potentiometer. As the enclosure dry bulb temperature decreases from 74° to 70° the slider 312 is progressively moved from left to right over the resistance element 314. The shaft 234 of the step controller also operates a slider 315 with respect to a conductor 316 and a resistance element 317, the slider 315 and the resistance element 317 forming a control potentiometer. When the enclosure dry bulb temperature decreases from 73° to 70° the slider 315 is moved progressively from left to right across the resistance element 317. The shaft 234 of the step controller also operates a slider 318 with respect to a resistance element 319 and conductors 320 and 321, the slider 318 and resistance element 319 forming a control potentiometer. When the enclosure dry bulb temperature decreases from 78° to 75° the slider 318 is progressively moved from the left to the right of the resistance element 319.

The outdoor dew-point temperature responsive controller 153 may be of the type shown and described in Patent No. 2,106,101, granted to Otto A. Labus and Robert B. P. Crawford on January 18, 1938, and for purposes of illustration in this application it is shown to comprise a casing 325 in which is located a relatively long coil 326 provided with suitable fins. Outside air is drawn over the coil 326 by a fan 327 driven by an electric motor 328. Water is supplied to the coil 326 from a supply pipe 329 under the control of a manually adjustable throttle valve 330 and a thermostatic snap action valve 331. The water flows through the coil 326 and due to the fins and the relatively long coil the temperature of the water emanating from the coil 326 through pipe 332 represents the approximate dew-point temperature of the outside air. This water at the dew-point temperature of the outside air then flows into a chamber 333 and out through a drain 334. A bellows 335 mounted on the chamber 333 is connected to a bulb 336 located in the chamber 333. The bulb 336 may be provided with a volatile fill so that the bellows 335 is expanded and contracted in accordance with the temperature of the water affecting the bulb 336 and hence, in accordance with the dew-point temperature of the outdoor air. The bellows 335 operates a lever 337 against the action of an adjustable tension spring 338. The lever 337 operates a slider 339 across a resistance element 340, the slider 339 and the resistance element 340 forming a control potentiometer. When the outside dew-point temperature is 80° the slider 339 assumes the position illustrated in Figure 2. As the outside dew-point temperature decreases the slider 339 is moved progressively to the left across the resistance element 340 until the outside dew-point temperature decreases to 33° whereupon the slider 339 assumes an extreme left hand position. When the temperature of the water passing to the chamber 33 decreases to 33° a bulb 342 located in intimate contact with this water operates through a capillary tube 341 to close the valve 331 which shuts off the supply of water to the coil 326. A suitable drain being provided, freezing up of the coil 326 in the winter-time is therefore prevented.

The proportioning motor 154 controlled by the dew-point temperature controller 153 may also be of the type shown and described in the above referred to Taylor patent. Power is supplied to the proportioning motor 154 by means of line wires 345 and 346 leading from some source of power (not shown). The proportioning motor 154 is provided with control terminals 347, 348, and 349 which are in turn connected by wires 350, 351, and 352, respectively, with the control potentiometer of the dew-point temperature controller. The proportioning motor operates a shaft 353 which forms a part of the step controller 155. The proportioning motor 154 and hence the shaft 353 are positioned in direct accordance with the adjustment of the potentiometer of the dew-point temperature controller 153. With the slider 339 of the dew-point temperature controller 153 in the extreme position shown the proportioning motor 154 is in an extreme position and as the slider 339 moves progressively toward the left the proportioning motor 154 is moved progressively through substantially 180° of rotation.

The shaft 353 of the step controller 155 operates cams 355 through 369, inclusive. Cam 355 operates an arm 371 which in turn operates a mercury switch 372 having electrodes 373 and 374. When the outside dew-point temperature falls below 55° the electrodes 373 and 374 are bridged. Cam 356 operates an arm 375 which in turn operates a mercury switch 376 having electrodes 377, 378, 379, and 380. When the outside dew-point temperature is above 55° the electrodes 377 and 378 are bridged and when the outside dew-point temperature falls below 55° the electrodes 379 and 380 are bridged. The cam 357 operates an arm 381 which in turn operates a mercury switch 382 having electrodes 383 and 384. As long as the outside dew-point temperature is above 35° the electrodes 383 and 384 are bridged. The cam 358 operates an arm 385 which in turn operates a mercury switch 386 having electrodes 387 and 388 and the electrodes 387 and 388 are bridged as long as the outside dew-point temperature is above 35°. The cam 359 operates an arm 389 which in turn operates a mercury switch 390 having electrodes 391 and 392 and the electrodes 391 and 392 are bridged as long as the outside dew-point temperature is above 35°.

The cam 360 operates an arm 393 which in turn operates a mercury switch 394 having electrodes 395, 396, 397, and 398. When the outside dew-point temperature is above 35° the electrodes 395 and 396 are bridged and when the dew-point temperature falls below 35° the electrodes 397 and 398 are bridged. The cam 361 operates an arm 399 which in turn operates a mercury switch 400 having electrodes 401, 402, 403, and 404. When the outside dew-point temperature is above 45° the electrodes 401 and 402 are bridged and when the dew-point temperature falls below 45° the electrodes 403 and 404 are bridged. The cam 362 operates an arm 405 which in turn operates a mercury switch 406 having electrodes 407, 408, 409, and 410. When the outside dew-point temperature is above 55° the electrodes 407 and 408 are bridged and when the dew-point temperature falls below 55° the electrodes 409 and 410 are bridged.

The cam 363 operates an arm 411 which in turn operates a mercury switch 412 having electrodes 413, 414, 415, and 416. When the outside dew-point temperature is above 55° the electrodes 413 and 414 are bridged and when the dew-point temperature falls below 55° electrodes 415 and 416 are bridged. The cam 364 operates an arm 417 which in turn operates a mercury switch 418 having electrodes 419, 420, 421, and 422. When the outside dew-point temperature is above 35° electrodes 419 and 420 are bridged and when it falls below 35° the electrodes 421 and 422 are bridged. Cam 365 operates an arm 423 which in turn operates a mercury switch 424 having electrodes 425, 426, 427, and 428. When the outside dew-point temperature is above 55° the electrodes 425 and 426 are bridged and when the dew-point temperature falls below 55° the electrodes 427 and 428 are bridged. The cam 366 operates an arm 429 which in turn operates a mercury switch 430 the arrangement being such that when the outside dew-point temperature is above 35° the electrodes 431 and 432 are bridged and when it falls below 35° the electrodes 433 and 434 are bridged.

The cam 367 operates an arm 435 which in turn operates a mercury switch 436 the arrangement being such that when the outside dew-point temperature is above 55° the electrodes 437 and 438 are bridged and when the dew-point temperature falls below 55° electrodes 439 and 440 are bridged. The cam 368 operates an arm 441 which in turn operates a mercury switch 442 having electrodes 443, 444, 445, and 446. When the outside dew-point temperature is above 35° the electrodes 443 and 444 are bridged and when the dew-point temperature falls below 35° electrodes 445 and 446 are bridged. The cam 369 operates an arm 447 which in turn operates a mercury switch 448, the arrangement being such that when the dew-point temperature is above 35° electrodes 449 and 450 are bridged and when the dew-point temperature falls below 35° electrodes 451 and 452 are bridged.

The shaft 353 of the step controller 155 operates a slider 453 with respect to a conductor 454 and a resistance element 455, the slider 453 and the resistance element 455 forming a compensating potentiometer. As the outside dew-point temperature decreases from 45° to 35° the slider 453 is moved progressively to the right across the resistance element 455.

The liquid level responsive controller 167 responding to the level of the hygroscopic fluid in the sump 19 may comprise a pivoted lever 458 having a float 459 and operating a mercury switch 460. When the liquid level of the hygroscopic fluid lowers the electrodes of the mercury switch 460 are bridged and when the level is restored to the desired value the electrodes of the mercury switch 460 are unbridged. Power is supplied to the electric motor 147 of the valve 146 by means of line wires 461 and 465 leading from some source of power (not shown). When both the enclosure dry bulb temperature falls below 74° and the outside dew-point temperature falls below 55°, a circuit is completed from the line wire 461 through electrodes 250 and 251 of the mercury switch 249, wire 462, electrodes 373 and 374 of the mercury switch 372, wire 463, electric motor 147, wire 464, and mercury switch 460 back to the other line wire 465. Hence, under these conditions the valve 146 is placed under the control of the mercury switch 460 of the liquid level controller 167 and is opened and closed by the liquid level controller 167 to maintain the level of the hygroscopic fluid in the sump 19 at a desired value. When either the dry bulb temperature of the enclosure rises above 74° or the outside dew-point temperature rises above 55° the supply of power to the electric motor 147 is interrupted and the valve 146 is closed.

The relay 164 for controlling the operation of the fan 104, and the damper motors 107 and 109 for dampers 106 and 108, respectively, may comprise a relay coil 468 for operating switch arms 469 and 470 with respect to contacts 471 and 472, respectively. When the relay coil 468 is energized the switch arms 469 and 470 are moved into engagement with their respective contacts 471 and 472 and when the relay coil 468 is deenergized the switch arms 469 and 470 are moved out of engagement with their contacts 471 and 472 by means of springs, gravity or other means (not shown). Power is supplied to the relay 164 by means of line wires 473 and 474 leading from some source of power (not shown).

When the outside dew-point temperature is above 55° a circuit is completed from the line wire 473 through electrodes 378 and 377 of the mercury switch 376 and relay coil 468 back to the other line wire 474. Accordingly when the outside dew-point temperature is above 55° the relay coil 468 is energized and the relay 164 is pulled in. Movement of the switch arm 470 into engagement with the contact 472 completes a circuit through the motors 107 and 109 of the dampers 106 and 108 to open these dampers. Movement of the switch arm 469 into engagement with the contact 471 completes a circuit through the electric motor 105 to cause operation of the fan 104. Accordingly when the outside dew-point temperature is above 55° the dampers 106 and 108 are open and the fan 104 is in operation. When the outside dew-point temperature is between 55° and 35° and the enclosure dry bulb temperature is above 74° the relay 164 is also pulled in through a circuit which may be traced from the line wire 473 through electrodes 379 and 380 of mercury switch 376, electrodes 384 and 383 of mercury switch 382, electrodes 255 and 254 of mercury switch 253, and relay coil 468 back to the other line wire 474. Accordingly when the outside dew-point temperature is between 55° and 35° and the enclosure dry bulb temperature is above 74° the fan 104 is in operation and the dampers 106 and 108 are opened.

When either the outside dew-point temperature falls below 35° or the dry bulb temperature falls below 74° providing the outside dew-point temperature is not above 55°, the fan 104 is stopped and the dampers 106 and 108 are closed.

The liquid level controller 169 responsive to the level of the chilled water in the evaporator-absorber arrangement 54 may comprise a pivoted lever 477 carrying a float 478 for operating a mercury switch 479. When the level of the chilled water lowers the switch 479 is tilted to a position to cause bridging of the electrodes therein and when the level of the chilled water is restored to the desired value the electrodes of the mercury switch 479 are unbridged.

The relay 165 for controlling the operation of the valves 45, 51, 96, and 89 may comprise a relay coil 481 for operating switch arms 482, 483, 484, and 485 with respect to contacts 486, 487, 488, and 489, respectively. When the relay coil 481 is energized the switch arms 482 and 485 are moved into engagement with their respective contacts 486 and 489 and the switch arms 483 and 484 are moved out of engagement with their respective contacts 487 and 488. When the relay coil 481 is deenergized the switch arms 482 and 485 are moved out of engagement with their respective contacts 486 and 489 and the switch arms 483 and 484 are moved into engagement with their respective contacts 487 and 488 by means of springs, gravity or other means (not shown). Power is supplied to the relay 165 by means of line wires 490 and 491 leading from some source of power (not shown).

When the outside dew-point temperature is above 35° a circuit is completed from the line wire 490 through electrodes 387 and 388 of mercury switch 386 and the relay coil 481 back to the other line wire 491 to energize the relay coil 481 to pull in the relay 165. Upon pulling in of the relay 165 movement of the switch arm 482 into engagement with the contact 486 opens the valve 45 and movement of the switch arm 485 into engagement with the contact 489 places the valve 89 under the control of the liquid level controller 169. Movement of the switch arms 483 and 484 out of engagement with their contacts 487 and 488 upon pulling in of the relay 165 closes the valves 51 and 96. When the outside dew-point temperature drops below 35° the relay coil 481 is deenergized and the relay 165 drops out. Dropping out of the relay 165 moves the switch arms 482 and 485 out of engagement with their respective contacts to close the valves 45 and 89 and causes movement of the switch arms 483 and 484 into engagement with their respective contacts to open the valves 51 and 96. Accordingly when the outside dew-point temperature is above 35° the valve 45 is opened, the valve 89 is under the control of the liquid level controller 169, and the valves 51 and 96 are closed. When the outside dew-point temperature falls below 35°, valves 45 and 89 are closed and valves 51 and 96 are open.

The relay 166 for controlling the operation of the fan 34, the pump 37, and the valves 75 and 139 may comprise a relay coil 501 for operating switch arms 502, 503, 504, and 505 with respect to contacts 506, 507, 508, and 509, respectively. When the relay coil 501 is energized the switch arms 502, 503, and 504 are moved into engagement with their respective contacts and the switch arm 505 is moved out of engagement with its contact. When the relay coil 501 is deenergized the switch arms 502, 503, and 504 are moved out of engagement with their respective contacts and the switch arm 505 is moved into engagement with its contact by means of springs, gravity or other means (not shown). Power is supplied to the relay 166 by means of line wires 510 and 511 leading from some source of power (not shown).

When the outside dew-point temperature is above 35° and the dry bulb temperature of the enclosure is above 74° a circuit is completed from the line wire 510 through relay coil 501, electrodes 391 and 392 of mercury switch 390 and electrodes 262 and 263 of mercury switch 261 back to the other line wire 511. Completion of this circuit energizes the relay coil 501 and pulls in the relay 166. Pulling in of the relay 166 completes a circuit to the motor 35 of the fan 34 to cause operation of the fan 34, energizes the electrically operated pump 37 to cause operation of the same, and energizes the motor 76 to open the valve 75. Pulling in of the relay 166 deenergizes the motor 140 to cause the valve 139 to be closed. When either the outside dew-point temperature falls below 35° or the enclosure dry bulb temperature falls below 74° the relay coil 501 is deenergized to drop out the relay 166. Dropping out of the relay 166 stops operation of the fan 34 and the pump 37 and closes the valve 75. Dropping out of the relay energizes the motor 140 to open the valve 139. Accordingly when both the outside dew-point temperature is above 35° and the enclosure dry bulb temperature is above 74° the fan 34 and pump 37 are operated, the valve 75 is open and the valve 139 is closed. When either the outside dew-point temperature falls below 35° or the enclosure dry bulb temperature falls below 74° the fan 34 and the pump 37 are stopped, the valve 75 is closed and the valve 139 is open.

Power is supplied to the vacuum pump 92 from line wires 513 and 514 leading from some source of power (not shown). When the enclosure dry bulb temperature is above 78° a circuit is completed from the line wire 513 through vacuum pump 92 and electrodes 259 and 258 of switch 257 back to the line wire 514 to cause operation of the vacuum pump 92. When the enclosure dry bulb temperature falls below 78° this circuit is interrupted and the vacuum pump 92 is shut down.

The proportioning motor 25 for operating the return air damper 24 may also be of the type shown and described in the above referred to Taylor patent. Power may be supplied to the proportioning motor 25 by means of wires 520 and 521 leading from some source of power (not shown). The proportioning motor 25 may be provided with control terminals 522, 523, and 524. Upon reference to the above referred to Taylor patent it is seen that the proportioning motor 25 may include a pair of series connected coils connected across the terminals 522 and 524, the junction of these coils being connected to the terminal 523. The proportioning motor 25 also includes a balancing potentiometer connected in parallel with these series connected coils. The proportioning motor 25 is so arranged that when the energization of the coil connected across the terminals 523 and 524 is less than the energization of the coil connected across the terminals 523 and 522 the proportioning motor 25 is operated to move the damper 24 towards a closed position and when the energization of the coil across the terminals 522 and 523 is less than the energization of the coil across the terminals 523 and 524 the proportioning motor 25 is operated to move the dampers 24 towards an open position.

The relative humidity responsive controller 162 responsive to the relative humidity within the enclosure may comprise a hygroscopic element 526 for operating a lever 527 against the action of an adjustable tension spring 528. The lever 527 operates a slider 529 with respect to a conductor 530 and a resistance element 531, the slider 529 and the resistance element 531 forming a control potentiometer. The lever 527 also operates a slider 532 with respect to a conductor 533 and a resistance element 534, the slider 532 and the resistance element 534 forming a control potentiometer. Electrically connected to the slider 532 and operated in unison therewith is a second slider 535 contacting with a center tapped resistance 536. As the relative humidity of the enclosure increases the hygroscopic element 526 expands and the sliders 529 and 532 move to the right with respect to their resistance elements and as the relative humidity decreases the sliders 529 and 532 move toward the left with respect to their resistance elements. For purposes of illustration it is assumed that when the relative humidity is at 55% the sliders 529 and 532 are in their extreme right-hand position and as the relative humidity decreases to 35% the sliders move to an extreme left hand position. Accordingly, as the relative humidity decreases from 55% to 45% the slider 529 moves from right to left across its resistance element 531 and as the relative humidity decreases from 45% to 35% slider 532 moves from right to left across its resistance element 534. When the slider 532 is in a mid position with respect to its resistance element 534 the slider 535 is at the middle of the center tapped resistance 536.

The control terminal 522 of the proportioning motor 25 is connected by wires 538 and 539 to the conductor 530 and hence to the left end of the resistance element 531. The control terminal 524 is connected by wires 540, 541, and 542 to the right end of the resistance element 531. Accordingly the resistance element 531 is connected across the terminals 522 and 524. The control terminal 522 is also connected by wires 538 and 543, variable resistance 544 and wires 545 and 546 to the left ends of the resistance elements 534 and 455 and the control terminal 524 is connected by wires 540, 541, 547, and 548 to the right ends of the resistance elements 534 and 455. Accordingly the resistance elements 534 and 455 are connected in parallel with respect to each other and across the control terminals 522 and 524. The center tap of the center tapped resistance 536 is connected by wires 549 and 550, variable resistance 551 and wire 552 to the slider 453 so that the potentiometers formed by the slider 532 and variable resistance 534 and the slider 453 and variable resistance 455 form a compensated control system.

Assume now that the outside dew-point temperature is above 55° and the room dry bulb temperature is above 74° a circuit is thereupon completed from the control terminal 523 through wire 554, electrodes 408 and 407 of the mercury switch 406, wire 555, electrodes 267 and 266 of the mercury switch 265 and wire 556 to the slider 529 of the humidity responsive controller 162. Accordingly the proportioning motor 25 is placed under the control of the potentiometer of the humidity responsive controller 162 formed by the slider 529 and the resistance element 531. As the relative humidity increases the external resistance across the terminals 523 and 524 is decreased to cause movement of the damper 24 towards a closed position and as the relative humidity decreases the external resistance across the terminals 522 and 523 is decreased to cause opening movement of the damper 24. Accordingly as the relative humidity in the enclosure decreases from 55% to 45% the return air damper 24 is moved from a closed position to an open position and vice versa as the relative humidity increases from 45% to 55%, the return air damper is moved from an open position towards a closed position. Since the positioning of the return air damper 24 determines the amount of dehumidified fresh air used for controlling the relative humidity in the enclosure 10 the relative humidity of the enclosure 10 is maintained within 45% and 55% when the outside dew-point temperature is above 55° and the enclosure dry bulb temperature is above 74°.

Assume now that the outside dew-point temperature is above 55° and that a damp rainy day occurs to cause the dry bulb temperature of the enclosure to fall below 74°. Under these conditions a circuit is completed from the control terminal 523 through wire 554, electrodes 408 and 409 of the mercury switch 406, wire 555, electrodes 268 and 269 of the mercury switch 265, and wires 557 and 540 back to the control terminal 524. Completion of this circuit substantially short-circuits the control terminals 523 and 524 to move the return air damper 24 to a closed position whereupon substantially all dehumidified fresh air is utilized for conditioning the enclosure 10. Under these rainy day conditions, as pointed out above, the dehumidifying unit acts to supply heat to the dehumidified air so that desired dry bulb temperatures are maintained within the enclosure.

Assume now that the outside dew-point temperature falls below 55° but remains above 45° whereupon a circuit is completed from the control terminal 523 through wire 554, electrodes 409 and 410 of the mercury switch 406, wire 558, electrodes 402 and 401 of the mercury switch 400 and wires 559, 542, 541, and 540 back to the control terminal 524. Completion of this circuit substantially short-circuits the control terminals 523 and 524 to close the return air damper 24 so that substantially all fresh air is utilized for conditioning the enclosure 10.

When the outside dew-point temperature falls below 45° but remains above 35° a circuit is completed from the control terminal 523 through wire 554, electrodes 409 and 410 of the mercury switch 406, wire 558, electrodes 403 and 404 of the mercury switch 400, wire 560, electrodes 396 and 395 of the mercury switch 398 and wire 561 to the sliders 532 and 453. Accordingly under these conditions the control potentiometer formed by the slider 532 and resistance element 534 and the compensating potentiometer formed by the slider 453 and the resistance element 455 are placed in control of the proportioning motor 25. Upon an increase in relative humidity the slider 532 moves to the right to decrease the external resistance across the terminals 523 and 524 to operate the proportioning motor 25 in a direction to close the return air damper 24, and upon a decrease in relative humidity the slider 532 is moved to the left with respect to the resistance element 534 to decrease the external resistance across the terminals 522 and 523 to cause the proportioning motor 25 to operate in a direction to open the return air damper 24. The amount of opening movement of the return air damper 24 is additionally controlled by the variable resistance 544 and for purposes of illustration it is assumed that the variable resistance 544 is so adjusted that the damper 24 can be moved only to the three-quarter open position. The compensating potentiometer formed by the slider 453 and resistance 455 operates to reset the control point of the humidity responsive controller 162, the variable resistance 551 being utilized for desensitizing the controlling action of the compensating potentiometer for this purpose. The parts are so arranged that when the outside dew-point temperature is 45° the control point of the relative humidity responsive controller 162 will be substantially 45% and as the outside dew-point temperature decreases from 45° to 35° the control point of the relative humidity responsive controller 162 is lowered to 35%. When the outside dew-point temperature is substantially 45° the relative humidity responsive controller 162 operates to position the damper 24 to maintain the relative humidity of the enclosure at substantially 45% and as the outside dew-point temperature decreases to 35° the control point of the humidity responsive controller 162 is lowered to maintain 35% relative humidity conditions within the enclosure. Summing up, the damper 24 is moved between a closed position and a three-quarter open position to maintain relative humidity conditions within the enclosure that are adjusted in accordance with variations in outside dew-point temperature. Hence as the outside dew-point temperature decreases the relative humidity condition maintained within the enclosure also decreases within the above prescribed limits.

When the outside dew-point temperature falls below 35° a circuit is completed from the control terminal 523 through wire 554, electrodes 409 and 410 of mercury switch 406, wire 558, electrodes 403 and 404 of mercury switch 400, wire 560, electrodes 397 and 398 of mercury switch 394, wire 562, variable resistance 563 and wires 564, 539, and 538 to the control terminal 522. This circuit substantially short-circuits the control terminals 522 and 523 to cause movement of the damper 25 towards the open position, the amount of opening movement being regulated by the variable resistance 563. Preferably resistance 563 is so adjusted that the damper 24 is moved to a three-quarter open position so that when the outside dew-point temperature is below 35° three-fourths return air and one-fourth fresh air is utilized for conditioning the enclosure 10.

The proportioning motor 125 for operating the three-way valve 124 may also be of the type shown and described in the above-referred to Taylor patent. Power is supplied to the proportioning motor 125 by means of wires 570 and 571 leading from some source of power (not shown). The proportioning motor 125 is provided with control terminals 572, 573, and 574. The control terminal 572 is connected by a wire 575 and the conductor 313 to the left end of the resistance element 314 of the step controller 152. The control terminal 574 is connected by wires 576 and 577 to the right end of the resistance element 314. Accordingly the resistance element 314 is connected across the control terminals 572 and 574.

Assume that the outside dew-point temperature is above 55° and that the enclosure dry bulb temperature is above 74°. A circuit is thereupon completed from the control terminal 573 through wire 578, electrodes 414 and 413 of the mercury switch 412 and wires 579 and 580 to the slider 312 of the step controller 152. Accordingly the control potentiometer formed by the slider 312 and the resistance element 314 is in control of the proportioning motor 125 and since the slider is in the extreme left hand position the external resistance across the control terminals 572 and 573 is substantially short-circuited to position the three-way valve 124 to pass the hygroscopic fluid through the heat exchanger 122. Under these conditions the heat exchanger 122 is in operation to cool the hygroscopic fluid of relatively high concentration flowing to the dehumidifying unit and to heat the hygroscopic fluid of relatively low concentration flowing to the concentrator 100.

As the dry bulb temperature of the enclosure decreases from 74° to 70° the external resistance across the control terminals 573 and 574 is decreased to operate the proportioning motor 125 in a direction to move the valve 124 towards the by-pass position. When the dry bulb temperature of the enclosure falls to 70° the valve 124 is so positioned that the heat exchanger 122 is completely by-passed. Accordingly when the outside dew-point temperature is above 55° the three-way valve 124 is controlled in accordance with variations in enclosure dry bulb temperature between 74° and 70° to move the valve 124 towards the by-pass position as the temperature decreases.

When the outside dew-point temperature is between 55° and 35° and the enclosure dry bulb temperature is above 74° the control terminal 573 of the motor 125 is connected to the slider 312 of the step controller 152 by means of wire 578, electrodes 415 and 416, of the mercury switch 412, wire 581, electrodes 420 and 419 of the mercury switch 418, wire 582, electrodes 273 and 272 of the mercury switch 271, and wires 583 and 580. Since the dry bulb temperature within the enclosure is above 74° the slider 312 is engaging the conductor 313 so that a substantially complete short-circuit is provided across the terminals 572 and 573 to cause the hygroscopic fluid of relatively high concentration to pass through the heat exchanger 122 to be cooled thereby. If now the outside dew-point temperature be between 55° and 35° and the enclosure dry bulb temperature should fall below 74° a circuit is completed from the control terminal 573 of the motor 125 through wire 578, electrodes 415 and 416 of the mercury switch 412, wire 581, electrodes 420 and 419 of the mercury switch 418, wire 582, electrodes 274 and 275 of the mercury switch 271, and wires 584, 585, and 576 to the control terminal 574. Completion of this circuit substantially completely short-circuits the control terminals 573 and 574 to operate the valve 124 to a position wherein the heat exchanger 122 is by-passed so that relatively hot hygroscopic fluid is delivered to the sump 19 for heating purposes. When the outside dew-point temperature falls below 35° a circuit is completed from the control terminal 573 through wire 578, electrodes 415 and 416 of the mercury switch 412, wire 581, electrodes 421 and 422 of the mercury switch 418 and wires 586, 585, and 576 to the control terminal 574. Completion of this circuit substantially short-circuits the terminals 573 and 574 to operate the three-way valve to cause the hygroscopic fluid to by-pass the heat exchanger 122.

Summing up when the outside dew-point temperature is above 55° the three-way valve 124 is controlled in accordance with variations in dry bulb temperature between 74° and 70° to move the valve 124 towards the by-pass position as the temperature decreases. When the outside dew-point temperature is between 55° and 35° and the enclosure dry bulb temperature is above 74° the three-way valve 124 is positioned to cause the hygroscopic fluid to flow through the heat exchanger 122. When the outside dew-point temperature falls below 35° or when the enclosure dry bulb temperature falls below 74° providing the outside dew-point temperature is not above 55°, the three-way valve is positioned to the by-pass position so that relatively hot fluid is delivered to the sump 19 for heating purposes.

The proportioning motor 129 for controlling the other three-way valve 128 may also be of the type disclosed in the above referred to Taylor patent. Power is supplied to this proportioning motor by means of wires 591 and 592 leading from some source of power (not shown). The control terminals of the proportioning motor 129 are connected by wires 593, 594, and 595 to a potentiometer contained within a housing 596 and operated by the proportioning motor 125. The potentiometer and connections are so arranged that the proportioning motor 129 moves simultaneously and coextensively with the proportioning motor 125. In this manner the three-way valves 124 and 128 are equally positioned upon changes in outdoor dew-point temperatures and enclosure dry bulb temperature.

The proportioning motor 137 for operating the steam valve 136 may also be of the type shown and described in the above referred to Taylor patent. Power is supplied to the proportioning motor 137 by means of wires 600 and 601 leading from some source of power (not shown). Proportioning motor 137 is provided with control terminals 602, 603, and 604, the series connected relay coils within proportioning motor 137 being connected to these control terminals.

The discharge temperature limit control 171 may comprise a bellows 606 connected to the bulb 172 located in the discharge duct 29. The bellows 606 operates a lever 607 against the action of an adjustable tension spring 608. The lever 607 operates a slider 609 with respect to a resistance element 610, the slider 609 and the resistance element 610 forming a limit potentiometer. For purposes of illustration it is assumed that when the discharge temperature is 65° the slider 609 assumes the position shown and as the discharge temperature decreases the slider 609 is moved to the right until the discharge temperature assumes a value of 60° whereupon the slider 609 will be in the extreme right hand position.

The control terminal 602 is connected by wires 612, 613, and 614 and conductor 316 to the left end of the resistance element 317 of the step controller 152 and the control terminal 604 is connected by wires 615, 616, and 617 to the right ends of the resistance element 317 and the resistance element 610. Accordingly the resistance element 317 is connected across the control terminals 602 and 604. The left end of the resistance element 610 is connected by wires 618 and 619 to the slider 315. A resistance 620 connected across wires 614 and 619 is utilized for the purpose of balancing the effect of the limiting resistance 610 when the slider 609 is in the extreme left hand position as shown in Figure 3.

Assume now that the outside dew-point temperature is above 55°. Under these conditions a circuit is completed from the control terminal 603 through wire 622, electrodes 426 and 425 of the mercury switch 424 and wires 623 and 612 back to the control terminal 602. This circuit substantially short-circuits the control terminals 602 and 603 to operate the proportioning motor 137 in a direction to close the valve 136. Accordingly when the outside dew-point temperature is above 55° the valve 136 is closed.

Assume now that the outside dew-point temperature falls below 55° but that the enclosure dry bulb temperature is above 74°. Under these conditions a circuit is completed from the control terminal 603 through wire 622, electrodes 427 and 428 of mercury switch 424, wire 624, electrodes 279 and 278 of mercury switch 277 and wires 625 and 612 back to the control terminal 602. This circuit also substantially short-circuits the terminals 602 and 603 to cause the valve 136 to be closed. Accordingly when the outside dew-point temperature falls below 55° but the enclosure dry bulb temperature remains above 74° the steam valve 136 is closed.

When the enclosure dry bulb temperature falls below 74° and the outside dew-point temperature is below 55° a circuit is completed from the control terminal 603 through wire 622, electrodes 427 and 428 of the mercury switch 424, wire 624, electrodes 280 and 281 of the mercury switch 277 and wire 626 to the slider 609 of the discharge temperature limit control 171. Since the slider 609 is usually in the extreme left hand position as shown in Figure 3 the control terminal 603 is therefore directly connected to the slider 315 of the step controller 152 so that the potentiometer formed by the slider 315 and the resistance element 317 is in direct control of the proportioning motor 137 under these conditions. As the space temperature decreases from 73° to 70° the external resistance across the control terminals 603 and 604 is progressively decreased to move the valve 136 progressively towards an open position and when the space temperature falls to 70° the valve 136 becomes wide open. Accordingly when the outside dew-point temperature is below 55° and the enclosure temperature falls below 74° the valve 136 is graduatingly positioned in accordance with variations in enclosure temperature between 73° and 70° to maintain the enclosure temperature at the desired value. As pointed out above, the resistance 620 is utilized for nullifying the effect of the limit resistance 610 when the slider 609 is in the position shown in Figure 3.

Assume now that the outside dew-point temperature is below 55°, that the enclosure dry bulb temperature is between 74° and 73° so that the steam valve 136 is closed, if the air entering the enclosure 10 should become sufficiently cold to cause drafts within the enclosure 10, that is, if the temperature of the discharge air should fall below 65°, the slider 609 of the discharge temperature limit control 171 moves towards the right. This right hand movement of the slider 609 adds resistance in series with the slider 315 to decrease the controlling effect of the slider 315 and reduces the external resistance across the control terminals 603 and 604 to move the valve 136 towards the open position. If the discharge temperature should fall to 60° the valve 136 will become completely open. In this manner the discharge temperature limit control 171 controls the steam valve 136 when the enclosure temperature is below 74° to prevent the discharge temperature from falling below a desired value, illustratively 65°.

Summing up, when the outside dew-point temperature is above 55° the steam valve 136 is closed, when the outside dew-point temperature falls below 55° and the enclosure dry bulb temperature is above 74° the steam valve 136 is also closed and when the enclosure dry bulb temperature falls below 74° providing the outside dew-point temperature is below 55°, the steam valve 136 is placed under the control of the enclosure dry bulb temperature step controller 152 and the discharge temperature limit control 171 to maintain desired dry bulb temperature conditions within the enclosure 10 and to prevent drafts within the enclosure 10.

The proportioning motor 82 for operating the chilled water throttling valve 81 may also be of the type shown and described in the above referred to Taylor patent. Power is supplied to the proportioning motor 82 by means of wires 630 and 631 leading from some source of power (not shown). The proportioning motor 82 is provided with control terminals 632, 633, and 634, the relay coils contained within the proportioning motor 82 being connected to these control terminals. The control terminal 632 is connected by wire 635 and conductor 320 to the left end of the resistance element 319 and the control terminal 634 is connected by wires 636 and 637, resistance 638, wire 639, and conductor 321 to the right end of the resistance element 319. Accordingly the resistance element 319 is connected across the control terminals 632 and 634.

Assume now that the outside dew-point temperature is above 35° and the enclosure temperature is above 74°, a circuit is thereupon completed from the control terminal 633 through wire 639, electrodes 432 and 431 of mercury switch 430, wire 640, electrodes 285 and 284 of the mercury switch 283 and wire 641 to the slider 318. Accordingly when the outside dew-point temperature is above 35° and the enclosure temperature is above 74°, the potentiometer formed by the slider 318 and the resistance element 319 is in control of the proportioning motor 82. As shown the slider 318 is in the extreme left hand position and therefore the control terminals 632 and 633 are substantially short-circuited to maintain the valve 81 in the wide open position. As the dry bulb temperature within the enclosure progressively decreases from 78° to 75° the external resistance across the control terminals 633 and 634 is progressively decreased to move the valve 81 from the wide open position to a minimum position determined by the resistance value of the resistance 638. Accordingly the valve 81 is graduatingly positioned between a wide open position and a minimum position in accordance with variations in enclosure dry bulb temperature between 78° and 75° to maintain desired dry bulb temperature conditions within the enclosure 10.

When the outside dew-point temperature is above 35° and the enclosure dry bulb temperature falls below 74° a circuit is completed from the control terminal 633 through wire 639, electrodes 432 and 431 of the mercury switch 430, wire 640, electrodes 286 and 287 of the mercury switch 283 and wires 642 and 636 to the control terminal 634. This circuit substantially short-circuits the control terminal 633 and 634 to move the valve 81 to a closed position to shut off the circulation of chilled water.

When the outside dew-point temperature falls below 35° a circuit is completed from the control terminal 633 through wire 639, electrodes 433 and 434 of mercury switch 430 and wires 643 and 636 to the control terminal 634. This circuit also substantially short-circuits the control terminals 633 and 634 to move the valve 81 to a closed position to shut off the circulation of chilled water.

The chilled water circulating pump 78 is supplied with power by means of wires 645 and 646 leading from some source of power (not shown) and a switch 647 operated by the proportioning motor 82 is utilized for controlling the operation of the pump 78. When the valve 81 is moved to the minimum position the switch 647 is opened and whenever the valve 81 is moved toward the open position from the minimum position, the switch 647 is closed. When the switch 647 is closed a circuit is completed from the line wire 645 through switch 647, wire 648, and circulating pump 78 back to the other line wire 646. Summing up, when the valve 81 is moved to the minimum position or closed, the pump 78 is stopped and whenever the valve 81 is not in the minimum or closed position the pump 78 is in operation.

The proportioning motor 116 for operating the steam valve 115 of the concentrator 100 may also be of the type disclosed in the above referred to Taylor patent. Power is supplied to the proportioning motor 116 by means of wires 650 and 651 leading from some source of power (not shown). The proportioning motor 116 is provided with control terminals 652, 653, and 654, the relay coils contained within the proportioning motor 116 being connected to these control terminals.

The relative humidity responsive controller 157 responding to the relative humidity of the fresh air leaving the sprays 15 and 18 may comprise a hygroscopic element 656 for operating a lever 657 against the action of an adjustable tension spring 658. The lever 657 operates a slider 659 across a resistance element 660 and a conductor 661 and also operates a slider 662 across a conductor 663 and a resistance element 664. Mechanically and electrically connected to the slider 662 is a slider 665 movable with respect to a center tapped resistance element 666. Upon an increase in relative humidity the sliders 659 and 662 are moved toward the left and upon a decrease in relative humidity these sliders are moved toward the right. For purposes of illustration it is assumed that when the relative humidity is 35% the sliders 659 and 662 are in the extreme left hand positions. As the relative humidity decreases from 35% to 30% the slider 659 progressively moves from left to right across the resistance element 660 and when the relative humidity decreases from 30% to 15% the slider 662 moves progressively from left to right across the resistance element 664. When the slider 662 is midway along the resistance element 664 the slider 665 engages the center of the center tapped resistance element 666.

The temperature controller 158 responding to the dry bulb temperature of the fresh air leaving the sprays 15 and 18 may comprise a bellows 668 connected by the capillary tube 159 to the bulb 160 located in the fresh air duct. The bellows 668 operates a lever 669 against the action of an adjustable tension spring 670. The lever 669 operates a slider 671 with respect to a resistance element 672 and a conductor 673 and the lever 669 also operates a slider 674 with respect to a conductor 675 and a resistance element 676. When the dry bulb temperature of the air leaving the sprays 15 and 18 is at 50° the sliders 671 and 674 are in the extreme left hand positions. As the dry bulb temperature increases from 50° to 70° the slider 671 is moved progressively from left to right over the resistance element 672 and when the dry bulb temperature increases from 70° to 115° the slider 674 is moved progressively to the right along the resistance element 676.

The humidity responsive controller 216 responsive to the relative humidity of the air leaving the concentrator 100 may comprise a humidity responsive element 681 for operating a lever 682 against the action of an adjustable tension spring 683. The lever 682 operates a mercury switch 684 having electrodes 685, 686, 687, and 688. When the relative humidity of the air leaving the concentrator is normal indicating that the hygroscopic fluid in the concentrator is not too highly concentrated the electrodes 685 and 686 are bridged but when the relative humidity of the air falls to a value, say 25%, indicating that the hygroscopic fluid in the concentrator 100 is becoming too highly concentrated with danger of the same solidifying the mercury switch 684 is tilted to bridge the electrodes 687 and 688.

The control terminal 652 of the proportioning motor 116 is connected by wires 689, 690, and 691 to the left ends of the resistance elements 672 and 660 and the control terminal 654 is connected by wires 692, 693, 694, and 695 to the right ends of the resistance elements 672 and 660. Accordingly the resistance elements 672 and 660 are connected across the control terminals 652 and 654. In a like manner the control terminal 652 is connected by wires 689, 696, and 697 to the right end of the resistance element 676 and to the left end of the resistance element 664 and the control terminal 654 is connected by wires 692, 693, 698, 699, and 700 to the left end of the resistance element 676 and to the right end of the resistance element 664. Accordingly the resistance elements 676 and 664 are connected across the control terminals 652 and 654. The center tapped resistance 666 is connected by wires 701 and 702, variable resistance 703 and wire 704 to the slider 674 whereby the potentiometer formed by the slider 662 and the resistance element 664 becomes a control potentiometer and the potentiometer formed by the slider 674 and the resistance element 676 becomes a compensating potentiometer for adjusting the control point of the control potentiometer. The variable resistance 703 is utilized in this connection for the purpose of desensitizing the controlling action of the compensating potentiometer so that the main control is obtained by the control potentiometer.

Assume now that the outside dew-point temperature is above 55°, that the enclosure dry bulb temperature is above 74°, and that the concentration of the hygroscopic fluid in the concentrator 101 is normal, a circuit is thereupon completed from the control terminal 653 through wire 706, electrodes 686 and 685 of the humidity responsive controller 216, wire 707, electrodes 436 and 437 of the mercury switch 436, wire 708, electrodes 291 and 290 of the mercury switch 287 and wires 709 and 710 to the slider 659 of the relative humidity responsive controller 157. Under these conditions the potentiometer formed by the slider 659 and the resistance element 660, is placed in control of the proportioning motor 116. Upon an increase in relative humidity the slider 659 moves to the left to decrease the external resistance across the control terminals 652 and 653 to move the valve 115 towards an open position and upon a decrease in relative humidity the slider 659 moves to the right to decrease the external resistance across the control terminals 653 and 654 to move the valve 115 towards a closed position. Accordingly under these conditions the valve 115 is graduatingly positioned by the relative humidity responsive controller 157 to maintain the relative humidity of the air leaving the sprays 15 and 18 between 30% and 35%.

Assume now that the outside dew-point temperature is still above 55° and that a rainy or damp day occurs to cause the enclosure temperature to fall below 74°. Under these conditions a circuit is completed from the control terminal 653 through wire 706, electrodes 686 and 685 of mercury switch 684, wire 707, electrodes 438 and 437 of the mercury switch 436, wire 708, electrodes 292 and 293 of the mercury switch 287 and wire 711 to the sliders 674 and 662 of the temperature responsive controller 158 and the humidity responsive controller 157. Under these conditions the proportioning motor 116 is placed under the control of a compensated control system having a control potentiometer operated in accordance with relative humidity and a compensating potentiometer operated in accordance with dry bulb temperature. As the relative humidity decreases the slider 662 moves to the right to decrease the external resistance across the control terminals 653 and 654 to move the valve 115 towards a closed position and as the relative humidity increases the slider 662 moves to the left to decrease the external resistance across the control terminal 652 and 653 to move the valve 115 towards an open position. Accordingly the valve 115 is graduatingly positioned in accordance with variations in relative humidity as detected by the humidity responsive controller 157. The compensating potentiometer formed by the slider 674 and the resistance element 676 acts to shift the control point of the control potentiometer. When the dry bulb temperature is substantially 70° the control point of the relative humidity responsive controller is maintained at substantially 30% and as the dry bulb temperature increases from 70° to 115° the control point of the relative humidity responsive controller is gradually lowered from 30% to 15%. By varying the control point of the relative humidity controller in accordance with the dry bulb temperature schedule the moisture content of the air is maintained substantially constant even though the dry bulb temperature thereof varies due to the by-passing of the heat exchanger 122 as pointed out above.

When the outside dew-point temperature is between 55° and 35° and the enclosure dry bulb temperature is above 74° a circuit is completed from the control terminal 653 through wire 706, electrodes 686 and 685 of the mercury switch 684, wire 707, electrodes 439 and 440 of the mercury switch 436, wire 716, electrodes 444 and 443 of the mercury switch 442, wire 713, electrodes 297 and 296 of the mercury switch 295 and wires 714 and 710 to the slider 659. Accordingly, the slider 659 of the relative humidity responsive controller 157 is placed in control of the steam valve 115 to maintain the relative humidity of the fresh air leaving the sprays 15 and 18 between 30% and 35%.

When the outside dew-point temperature falls below 55° but remains above 35° and the enclosure temperature falls below 74°, a circuit is completed from the control terminal 653 through wire 706, electrodes 686 and 685, wire 707, electrodes 439 and 440 of the mercury switch 436, wire 716, electrodes 444 and 443 of mercury switch 442, wire 713, electrodes 298 and 299 of mercury switch 295, and wires 716, 698, 693 and 692 to the control terminal 654. Under these conditions the control terminals 653 and 654 are substantially short-circuited to move the valve 115 to a closed position so that steam is not supplied to the concentrator 100.

When the dew-point temperature falls below 35° a circuit is completed from the control terminal 653 through wire 706, electrodes 686 and 685, wire 707, electrodes 439 and 440 of mercury switch 436, wire 716, electrodes 445 and 446 of mercury switch 442, and wire 717 to the slider 671 of the temperature responsive controller 156. Under these conditions the control potentiometer formed by the slider 671 and the resistance element 672 is placed in control of the proportioning motor 116 and hence the steam valve 115. As the dry bulb temperature increases the slider 671 is moved to the right to decrease the external resistance across the terminals 653 and 654 to move the valve 115 towards a closed position and as the temperature decreases the slider 671 is moved to the left to decrease the external resistance across the control terminals 652 and 653 to move the valve 115 towards an open position. Accordingly the valve 115 is graduatingly positioned to maintain the dry bulb temperature of the air leaving the sprays 15 and 18 between 50° and 70°. As pointed out above when the outside air is warm, say 40°, the temperature of the air leaving the sprays is maintained at substantially 70° but as the outside temperature decreases to, say 0°, the control point of the temperature responsive controller droops due to the increase in heating load and the temperature of the air leaving the sprays 15 and 18 is maintained at 50°. Since the amount of moisture given off by the sprays 15 and 18 decreases as the temperature of the air decreases less moisture is given off in cold weather than in warm weather and accordingly the air leaving the sprays contains less moisture during cold weather than during warm weather. This effectively prevents the frosting of windows and the condensation of moisture on the outside walls of the enclosure 10.

If the relative humidity of the air leaving the concentrator 100 should decrease to a value (25% as illustrated) indicating that the hygroscopic fluid in the concentrator 100 is becoming too highly concentrated the mercury switch 684 is tilted to a position to bridge the electrodes 687 and 688 to complete a circuit from the control terminal 653 through wire 706, electrodes 687 and 688 and wires 718 and 692 to the control terminal 654. Completion of this circuit substantially short-circuits the control terminals 653 and 654 to close the steam valve 115 to stop the concentrating of the hygroscopic fluid. Accordingly the relative humidity responsive controller 216 responding to the relative humidity of the air leaving the concentrator 100 acts as a limit control to prevent the hygroscopic fluid from becoming too high concentrated with the danger of becoming solidified. Obviously any other type of concentration responsive device may be utilized such as a density regulator or a relative conductivity controller in the concentrator, comprising the conductivity of the solution in the concentrator pan with that of a reference solution of desired maximum allowable concentration.

The three-way valve 209 which controls the supply of concentrated hygroscopic fluid to the sump 19 and to the nozzle 9 is operated by a proportioning motor 210 which may also be of the type shown and described in the above referred to D. G. Taylor patent. Power is supplied to the proportioning motor 210 by means of line wires 720 and 721 leading from some source of power (not shown). The proportioning motor 210 may also be provided with control terminals 722, 723, and 724, the series connected relay coils in the proportioning motor 210 being connected to these control terminals. The temperature responsive controller 212 responding to the temperature of the hygroscopic fluid leaving the evaporator-absorber arrangement 54 may comprise a bellows 726 connected by the capillary tube 213 to the bulb 214 which is preferably charged with a volatile fluid so that the bellows 726 is operated in accordance with temperature changes. The bellows 726 operates a lever 727 against the action of an adjustable tension spring 728. The lever 727 in turn operates a slider 729 with respect to a resistance element 730, the slider 729 and resistance element 730 forming a control potentiometer for the proportioning motor 210. Upon an increase in temperature the slider 729 is moved to the left and upon a decrease in temperature it is moved toward the right. Accordingly the slider 729 is positioned in accordance with the sensible cooling load of the enclosure as determined by the temperature of the hygroscopic fluid emanating from the evaporator-absorber arrangement 54.

The control terminal 722 is connected by a wire 732 to the left end of the resistance element 730 and the control terminal 724 is connected by wires 733 and 734 to the right end of resistance element 730. The resistance element 730 is therefore connected across the control terminals 722 and 724. When the dry bulb temperature within the enclosure is above 80° a circuit is completed from the control terminal 723 through wire 735, electrodes 303 and 302 of the mercury switch 301 and wire 736 to the slider 729 of the temperature responsive controller 212. Accordingly the temperature responsive controller 212 is placed in control of the three-way valve 209 under these conditions. Upon an increase in temperature of the hygroscopic fluid the valve 209 is positioned to supply more of the hygroscopic fluid to the nozzle 59 and less to the sump 19 and upon a decrease in temperature the three-way valve 209 is positioned to supply more of the hygroscopic fluid to the sump 19 and less to the nozzle 59. In this manner the cooling capacity of the evaporator-absorber arrangement 54 is varied in accordance with the cooling load when the enclosure dry-bulb temperature is above 80°. When the enclosure dry bulb temperature falls below 80° a circuit is completed from the control terminal 723 through wire 735, electrodes 304 and 305 of the mercury switch 301 and wires 737 and 733 to the control terminal 724. Completion of this circuit substantially short-circuits the control terminals 723 and 724 to position the three-way valve 209 to cause all of the hygroscopic fluid to be delivered to the sump 19 and none to the nozzle 59.

The proportioning motor 204 which operates the valve 203 may also be of the type shown and described in the above referred to D. G. Taylor patent and power is supplied to this proportioning motor by means of line wires 740 and 741 leading from some source of power (not shown). The proportioning motor 204 is provided with control terminals 742, 743, and 744 which are connected to the series connected relay coils enclosed within the proportioning motor 204. The temperature responsive controller 205 responding to the temperature of the hygroscopic fluid leaving the heat exchanger 200 may comprise a bellows 746 connected by the capillary tube 206 to the bulb 207 which is preferably charged with a volatile fluid so that the bellows 746 is operated in accordance with temperature changes. The bellows 746 operates a lever 747 against the action of an adjustable tension spring 748. The lever 747 in turn operates a slider 749 with respect to a resistance element 750, the slider 749 and the resistance element 750 forming a control potentiometer for the proportioning motor 204. Upon an increase in temperature the slider 749 is moved towards the left and upon a decrease in temperature it is moved toward the right, the slider 749 assuming an extreme left hand position at a temperature of 110° and an extreme right hand position at a temperature of 90°. The control terminal 742 is connected to the left end of the resistance element 750 by a wire 752 and the control terminal 744 is connected by wires 753 and 754 to the right end of the resistance element 750. Accordingly the resistance element 750 is connected across the control terminals 742 and 744.

Assume now that the outside dew-point temperature is above 35° and that the enclosure dry bulb temperature is above 75°. Under these conditions a circuit is completed from the control terminal 743 through wire 755, electrodes 450 and 449 of the mercury switch 448, wire 756, electrodes 309 and 308 of the mercury switch 307 and wire 757 to the slider 749. Accordingly the temperature responsive controller 205 is placed in control of the proportioning motor 204 and hence the valve 203 under these conditions. Upon an increase in temperature the valve 203 is moved towards a closed position to cause more of the cool water to flow through the heat exchanger 200 and upon a decrease in temperature the valve 203 is moved toward an open position to cause less of the cool water to flow through the heat exchanger 200. In this manner the temperature of the hygroscopic fluid leaving the heat exchanger 200 is maintained within desired limits.

If now the outside dew-point temperature be above 35° and the enclosure dry bulb temperature falls below 75° a circuit is completed from the control terminal 743 through wire 755, electrodes 450 and 449 of the mercury switch 448, wire 756, electrodes 310 and 311 of the mercury switch 307 and wires 758, 759, and 753 to the control terminal 744. Completion of this circuit substantially short-circuits the control terminals 743 and 744 to operate the valve to a wide open position so that substantially no cooling water passes through the heat exchanger 200. As the outside dew-point temperature falls below 35° a circuit is completed from the control terminal 743 through wire 755, electrodes 451 and 452 of the mercury switch 448 and wires 760, 759, and 753 to the control terminal 744. Completion of this circuit also substantially short-circuits the control terminals 743 and 744 to completely open the valve 203 to prevent substantially the flow of cool water through the heat exchanger 200.

In summarizing the operation of the complete air conditioning system let it first be assumed that the outside dew-point temperature is above 55° and that the enclosure dry bulb temperature is above 80°, this representing the greatest conditioning load in the summertime. Under these conditions the steam valve 115 is under the control of the humidity responsive controller 157 for controlling the concentration of the hygroscopic fluid in the dehumidifying unit to maintain the relative humidity of the fresh air leaving the sprays 15 and 18 between 30% and 35%. This fresh air of relatively low relative humidity when mixed with the return air in proper proportions maintains the relative humidity within the enclosure 10 at the desired value. The fan 104 of the concentrator 100 is in operation and the dampers 106 and 108 are open so that the concentrator drives off moisture from the hygroscopic fluid thereby concentrating the same. The humidity controller 216 at all times prevents the hygroscopic fluid from becoming too highly concentrated. The three-way valves 124 and 128 are so positioned that the heat exchanger 122 is in operation to supply the coldest possible hygroscopic fluid to the dehumidifying unit and to preheat the hygroscopic fluid returning to the concentrator 100. The heat exchanger 200 is operating to maintain the temperature of the concentrated hygroscopic fluid within desired limits as determined by the temperature responsive controller 205 controlling the valve 203. The fan 34 and the pump 37 associated with the cooling tower 30 are in operation to supply cold water to the coils 16 and 17 to cool the hygroscopic fluid and therefore increase the dehumidifying and cooling action thereof. The valve 45 is maintained opened so that make up water can be supplied to the cooling tower 30 to make up for the water evaporated therein during the cooling process. At this time the valve 51 is closed to prevent draining of the coils 16 and 17. The valve 146 is closed so that water cannot be supplied to the hygroscopic fluid in the sump 19 during this dehumidifying period. The return air damper 24 is under the control of the enclosure relative humidity responsive controller 162 and acts to close the damper as the relative humidity increases to utilize more of the dehumidified fresh air and acts to open the return air damper as the relative humidity decreases to utilize less of the dehumidified fresh air. In this manner the relative humidity within the enclosure 10 is maintained between 45% and 50%. The vacuum pump 92 is in operation thereby reducing the air friction in the evaporator-absorber arrangement 54 so that the evaporator-absorber arrangement is operating at its maximum cooling capacity. The chilled water throttling valve 81 is under the control of the step controller 152 and at the 80° dry bulb temperature assumed this valve is wide open. The circulating pump 78 for the chilled water circuit is in operation. The valve 89 which controls the supply of make up water to the evaporator-absorber arrangement is under the control of the liquid level controller 169 to maintain the correct amount of chilled water in the system. The valve 75 between the coils 26 and the evaporator-absorber arrangement 54 is open so that a complete circulating system is provided for the chilled water. The valve 96 is closed to prevent draining of the chilled water from the system, the steam valve 136 is closed to prevent the supply of steam to the coils 26, and the valve 139 is closed to prevent communication between the coils 26 and the condensate line 119. The three-way valve 209 is under the control of the temperature responsive controller 212 to supply concentrated hygroscopic fluid to the evaporator-absorber arrangement 54 in accordance with the sensible cooling load so that the evaporator-absorber arrangement 54 is operating at maximum capacity to chill water for the coils 26. Under the above outlined conditions it is seen that during maximum summer loads the dehumidifying apparatus and the cooling apparatus are operating at maximum capacity to maintain desired dry bulb temperature conditions and relative humidity conditions within the enclosure 10.

Assume now that the outside dew-point temperature is still above 55° and that the dry bulb temperature in the enclosure decreases progressively from above 80° to 75°. When the dry bulb temperature decreases to 80° the three-way valve 209 is positioned to pass all of the concentrated hygroscopic fluid to the dehumidifying unit for dehumidifying purposes, the peak sensible cooling load having passed. When the dry bulb temperature of the enclosure decreases to 78° the vacuum pump 92 is stopped to decrease the cooling capacity of the evaporator-absorber arrangement 54 whereupon the coils 26 absorb less heat from the air passing thereover. As the enclosure dry bulb temperature decreases from 78° to 75° the chilled water throttling valve 81 is graduatingly moved from an open position to a minimum position to throttle the flow of chilled water through the coil 26 for further reducing the cooling action thereof. When the enclosure dry bulb temperature finally assumes a value of 75°, the chilled water pump 78 shuts off. Accordingly when the dry bulb temperature decreases to 75° further cooling is not necessary and therefore the cooling apparatus is shut down.

If now a damp rainy day should occur wherein the outside dew-point temperature is still above 55° and the enclosure dry bulb temperature tends to fall below 74° the three-way valves are graduatingly positioned as the temperature falls from 74° to 70° to by-pass the heat exchanger 122. Under these conditions warmer hygroscopic fluid is delivered to the dehumidifying unit to increase the temperature of the air passing therethrough to increase the temperature within the enclosure 10. Since the valve 203 is moved to a wide open position at 75° enclosure dry bulb temperature, the heat exchanger 200 is rendered inoperative so that under these conditions it does not act to cool the concentrated hygroscopic fluid. When the temperature of the enclosure decreases to 74°, the steam valve 115 for the concentrator 100 is placed under the control of the relative humidity controller 157 compensated by the temperature responsive controller 158. As the three-way valves 124 and 128 are graduatingly positioned to by-pass the heat exchanger 122 as pointed out immediately above the temperature of the air leaving the sprays 15 and 18 tends to increase thereby lowering the relative humidity of this air. By adjusting the control point of the relative humidity responsive controller 157 downwardly as the dry bulb temperature of the air rises, the moisture content of the air leaving the sprays 15 and 18 may be maintained substantially constant even though the dry bulb temperature thereof is increased for heating the enclosure 10. Accordingly even though the temperature of the fresh dehumidified air is increased for heating purposes on these rainy or damp days the amount of dehumidification obtained remains substantially constant. The fan 34 and the pump 37 of the cooling tower 30 are shut off under these conditions so that the hygroscopic fluid will not be cooled by the coils 16 and 17 which further increases the heating action of the sprays 15 and 18. At this time the return air damper 24 is closed so that substantially all warm dry air is utilized for conditioning the enclosure 10 to give the occupants of the enclosure 10 a warm and comfortable feeling on these damp and rainy days. The valve 75 is closed and the valve 139 is opened when the enclosure dry bulb temperature falls below 74° but this makes no difference inasmuch as the valves 81 and 136 are closed at this time. Accordingly when the outside dew-point temperature is above 55° and there is a damp rainy condition which tends to cause the enclosure temperature to decrease below 74° the dehumidifying unit not only acts to dehumidify the air passing therethrough but also acts to heat the air to maintain desired temperature conditions within the enclosure 10.

During the fall and spring of the year the dew-point temperature of the outside air usually varies between 55° and 35° and under these conditions it is desirable to ventilate the enclosure 10 and heat and cool the same when necessary. Accordingly when the outside dew-point temperature is between 55° and 35° and the enclosure dry bulb temperature is above 74° cooling of the enclosure is required. Assume that the enclosure dry bulb temperature is 80°, under these conditions the steam valve 115 is under the control of the relative humidity responsive controller 157 to maintain the relative humidity of the air entering the air conditioning unit 11 between 30% and 35%. The fan 104 of the concentrator 100 is on and the dampers 106 and 108 of the concentrator 100 are opened so that the hygroscopic fluid will be concentrated to provide dehumidification if necessary and to provide concentrated hygroscopic fluid for the evaporator-absorber arrangement 54 so that cooling can be performed by the coils 26. The three-way valves 124 and 128 are positioned so that the heat exchanger 122 is in operation for cooling the hygroscopic fluid and the valve 203 controlling the operation of the heat exchanger 200 is under the control of the temperature responsive controller 205 to cool further the hygroscopic fluid being delivered to the dehumidifying unit. The fan 34 and the pump 37 are in operation to supply cool water to the coils 16 and 17 to precool the fresh air. The valve 45 which controls the supply of make up water to the cooling tower 30 is open and the valve 51 which drains the cooling tower circuit is closed. The valve 146 which supplies make up water to the sump 19 is closed since under these conditions it is not desirable to dilute the hygroscopic fluid. The vacuum pump 92 is in operation so that the evaporator-absorber arrangement 54 is operating at maximum capacity. The chilled water throttling valve 81 is wide open and the chilled water circulating pump 78 is on to circulate chilled water through the coils 26 for cooling the air delivered to the enclosure 10. The valve 89 which supplies make-up water to the evaporator-absorber arrangement 54 is under the control of the liquid level controller 167. Valve 75 controlling the communication between the coils 26 and the evaporator-absorber arrangement 54 is open to allow circulation of chilled water and the valve 96 which drains the chilled water circuit is closed. The steam valve 136 controlling the supply of steam to the coils 26 is closed during this cooling cycle and the valve 139 controlling communication between the coil 26 and the condensate line is closed. Accordingly under these conditions the cooling apparatus and the dehumidifying apparatus are in operation to cool the enclosure and to maintain the relative humidity of the fresh air within desired limits.

As the enclosure dry bulb temperature decreases from 80° to 75° the vacuum pump 92 is turned off at 78° and the chilled water throttling valve 81 is moved from a wide open position to minimum position as the temperature decreases from 78° to 75°. When the enclosure temperature decreases to 75° the chilled water pump 78 is shut off to stop the circulation of chilled water through the coils 26 and also at this time the heat exchanger 200 is rendered inoperative.

When the outside dew-point temperature is between 55° and 35° and the enclosure dry bulb temperature falls below 74°, heating of the air delivered to the enclosure is required and under these conditions the steam valve 115 is closed since there is no need at this time for concentrating the hygroscopic fluid, the system operating on a ventilating and heating cycle. The fan 104 of the concentrator 100 is stopped and the dampers 106 and 108 are closed. Valves 124 and 128 are positioned so that the heat exchanger 122 is by-passed. The fan 34 and the pump 37 of the cooling tower 30 are turned off since no cooling is desired during this heating cycle. The valve 146 is placed under the control of the liquid level controller 167 so that if the sprays give up moisture to the air, water may be added thereto through the valve 146. The chilled water throttling valve 81 is completely closed and the pump 78 is completely shut off since no cooling is required at this time. The valve 75 controlling communication between coils 26 and the evaporator-absorber arrangement 54 is closed so that it is impossible to circulate chilled water through the coil 26. The steam valve 136 which controls the supply of steam to the coils 26 is placed under the control of the step controller 152 and is graduatingly moved towards an open position as the enclosure temperature decreases from 73° to 70° whereby the temperature of the enclosure is maintained at desired values. Accordingly when the outside dew-point temperature is between 55° and 35° and the enclosure dry bulb temperature falls below 74° the sprays 15 and 18 humidify or dehumidify the air entering the air conditioning unit dependent upon whether the relative humidity of the fresh air is low or high. The sprays 15 and 18 are not heated so that they assume the temperature of the outside air and the system operates primarily on a ventilating cycle. The coils 26 operate to heat the air to maintain desired temperature conditions within the enclosure 10.

During the fall and spring, that is, during the ventilating period, the return air damper 24 is completely closed when the outside dew-point temperature is between 55° and 45° so that all fresh air is utilized for ventilation purposes. When the outside dew-point temperature is between 45° and 35° the return air damper 24 is placed under the control of the relative humidity responsive controller 162 and compensated by outside dew-point temperatures. In other words the damper 24 is controlled in accordance with enclosure relative humidity conditions and the control point of the relative humidity responsive controller is lowered from 45% to 35% as the outside dew-point temperature decreases from 50° to 35°. This lowering of the relative humidity within the enclosure 10 as the outside dew-point temperature decreases prevents the condensation of moisture on the outside walls of the enclosure 10.

When the outside dew-point temperature falls below 35° the control system is placed on a winter heating cycle to heat the air delivered to the enclosure and to humidify the fresh air supplied to the enclosure. In order to accomplish this sequence of operation the steam valve 115 for the concentrator 100 is controlled by the temperature responsive controller 158 for preheating and humidifying the fresh air. To accomplish this hot fluid is delivered to the sprays 15 and 18 and the temperature of this fluid is controlled by the temperature responsive controller 158 to maintain the temperature of the air leaving the sprays 15 and 18 between 50° and 70°. As pointed out above, when the outside temperature is relatively warm the air leaving the sprays will be maintained at substantially 70° and as the outside temperature decreases the control point of the temperature responsive controller 158 droops so that the temperature of the air leaving the sprays 18 is maintained at substantially 50° when the outside temperature is relatively cold. Since the amount of moisture given off by the sprays 15 and 18 decreases as the temperature of the air decreases, less moisture is given off by the sprays 15 and 18 when the outside temperature is relatively cold than when it is relatively warm. Accordingly when it is cold outside less moisture is delivered to the enclosure 10 and therefore frosting of the windows and condensation of moisture on the outside walls of the enclosure 10 is prevented. During this winter heating cycle the fan 104 is shut off and the dampers 106 and 108 are closed so that the concentrator will not concentrate the hygroscopic fluid but will act only to heat the same for preheating purposes. The three-way valves 124 and 128 are so positioned that the heat exchanger 122 is by-passed and also the heat exchanger 200 is rendered inoperative at this time. The fan 34 and the pump 37 of the cooling tower 30 are shut off, the valve 45 which controls the supply of make up water to the cooling tower 30 is closed and the valve 51 which drains the cooling tower circuit is open, hence the water is drained out of the cooling tower circuit to prevent freezing of the same. The valve 146 is under the control of the liquid level controller 167 to supply make up water to the sump 19 to make up for the moisture taken from the sprays 15 and 18 during the humidifying cycle. The chilled water throttling valve 81 is closed, the pump 78 is turned off, the valve 89 controlling the supply of make up water to the evaporator-absorber arrangement 54 is closed, the valve 75 which controls the communication between the coils 26 and the evaporator-absorber arrangement 54 is closed and the drain valve 96 is opened to drain the water from the chilled water circuit to prevent freezing of the same during the winter-time. Valve 139 controlling the communication between the coil 26 and the condensate line 119 is opened and the steam valve 136 controlling the supply of steam through the coil 26 is under the control of the step controller 152 to maintain desired temperatures within the enclosure 10. The limit control 171 operates in conjunction with the step controller 152 to prevent drafts within the enclosure 10. The return air damper 24 is moved to a three-quarter open position so that substantially one-fourth fresh air and three-fourths return air are utilized during the winter heating cycle. Accordingly when the outside dew-point temperature is below 35° the coil 26 operates to heat the air delivered to the enclosure to maintain desired temperature conditions within the enclosure and the sprays 15 and 18 operate to preheat the fresh air and humidify the same.

If when the outside dew-point temperature is between 35° and 55° and the enclosure dry bulb temperature is below 74° so that cooling of the air is not required the pumps 60 and 71 may be automatically turned off by the step controllers 155 and 152 to stop the sprays 15 and 18 and this may be desirable from an economy standpoint. Also under these conditions it is not absolutely necessary to have the sprays 15 and 18 operating since the relative humidity of the fresh air will be at practically the desired value. There will be relatively large changes in solution volume between summer and winter humidity requirements for this system and therefore the dehumidifier and concentrator should be so constructed as to take care of these surges in solution volume either by constructing the dehumidifier and concentrator large enough or by providing a surge or storage reservoir for the solution automatically controlled to accommodate these surges.

Figure 5 diagrammatically illustrates a control arrangement which may be substituted for the humidity controller 216 of Figures 1 and 4 for preventing the concentration of the hygroscopic fluid in the concentrator 100 from becoming too high. In effect Figure 5 illustrates a different manner for operating the mercury switch 684 of Figure 4 to close the steam valve 115 when the concentration of the hygroscopic fluid becomes too great. The control arrangement of Figure 5 is responsive to the concentration of the hygroscopic fluid in the concentrator 100 by responding to the relative conductivity of the hygroscopic fluid in the concentrator and of a reference hygroscopic fluid in a suitable container. Definitely spaced electrodes 800 and 801 are located in the hygroscopic fluid in the concentrator 100 and calibrated definitely and equally spaced electrodes 103 and 104 are located in a reference container preferably made of very thin material so as to transmit heat between the hygroscopic fluid in the concentrator 100 and the reference hygroscopic fluid in the container 802. The two hygroscopic fluids will therefore be of substantially the same temperature. The reference hygroscopic fluid having a predetermined concentration is placed within the container 802 around the electrodes 803 and 804 and then the container is sealed by a suitable closure 805.

A polarized relay 806 operates an arm 807 which in turn operates the mercury switch 684. A resistance 808 is contacted by a slider 809. Power is supplied to the control arrangement by means of a step-down transformer 810 having a primary 811 connected across line wires 812 and 813 leading from some source of power (not shown) and a secondary 814. One end of the secondary 814 is connected by wires 815, 816, and 817 to the electrode 801 and the other end of the secondary is connected by wires 818, 819, and 820 to the electrode 803. The resistance 808 is connected across the secondary 814 by wires 815 and 818. The electrodes 800 and 804 are connected together by wires 821 and 822 and are connected by a wire 823 to the polarized relay 806. The polarized relay 806 is in turn connected by a wire 824 to the slider 809. One end of the secondary 814 is connected by wires 815, 816, and 825 to the polarized relay 806 and the other end of the secondary is connected by wires 818, 819, and 826 to the polarized relay 806 to supply a reference voltage to the polarized relay 806 so that the relay 806 may operate on alternating current. The transformer 810 is so arranged that the voltage delivered by the secondary thereof is below the dissociation voltage of the hygroscopic fluid for example less than a maximum voltage of one volt. By thus limiting the voltage applied to the control system the hygroscopic fluid in the concentrator 100 and in the chamber 802 is prevented from dissociation.

The above wiring connections form a Wheatstone bridge circuit for controlling operation of the polarized relay 806. When the concentration of the hygroscopic fluid within the concentrator 100 is less than the concentration of the hygroscopic fluid within the container 802 the resistance to current flow between the electrodes 800 and 801 is less than the resistance to current flow between electrodes 803 and 804. This unbalances the Wheatstone bridge circuit in one direction to position the polarized relay 806 to cause the mercury switch 684 to be tilted to the position shown in Figure 5. When the mercury switch 684 is in this position the steam valve 115 is under control of the control system illustrated in Figure 4 to cause operation of the concentrator to maintain desired relative humidity conditions. If now the concentration of the hygroscopic fluid in the concentrator 100 becomes more highly concentrated than the concentration of the reference hygroscopic fluid in the container 802 then the resistance to current flow between the electrodes 800 and 801 is less than the resistance to current flow between the electrodes 803 and 804. This causes the Wheatstone bridge circuit to be unbalanced in the opposite direction to operate the polarized relay 806 to position the mercury switch 684 in the opposite position which causes bridging of the electrodes 687 and 688. By reference to Figure 4 it will be seen that bridging of the electrodes 687 and 688 closes the steam valve 115 to stop operation of the concentrator. By adjusting the slider 809 with respect to the resistance element 808 the concentration of the hygroscopic fluid in the concentrator 100 may be adjusted with respect to the concentration of the hygroscopic fluid in the container 802. From the above it is seen that Figure 5 sets forth a control arrangement which is directly responsive to the concentration of the hygroscopic fluid in the concentrator 100 for preventing the hygroscopic fluid in the concentrator 100 from becoming too highly concentrated. Obviously the mercury switch 684 of Figure 5 may control directly the steam valve 115 instead of operating in conjunction with the control circuits shown in Figures 1 and 4. In such an arrangement the steam valve 115 would be controlled directly by the control arrangement of Figure 5 to maintain the concentration of the hygroscopic fluid in the concentrator 100 within definite limits.

Instead of utilizing the control systems shown in Figures 1 and 4 for controlling the steam valve the control arrangement of Figure 5 may be utilized as the sole control for the steam valve 115 and if such be the case it may be desirable to locate the electrodes 800 and 801 and the container 802 in the sump 19 of the dehumidifying unit instead of in the concentrator 100. Such a control arrangement would operate to control the steam valve 115 to maintain the concentration of the hygroscopic fluid in the sump 19 within predetermined limits.

Figure 6 illustrates a manner in which the steam valve 115 may be modulatingly controlled by the control arrangement of Figure 5. Here the same construction as is utilized in Figure 5 is used with the exception that the polarized relay 806 operates a single pole double throw switch formed by the arm 807 and spaced contacts 840 and 841. In Figure 6 electrodes 800 and 801 and the container 802 are shown to be located in the sump 19 of the dehumidifying unit 11. Steam valve 115 is controlled by a motor 828 which may comprise rotors 829 and 830 which are influenced by field windings 831 and 832, respectively. The rotors 829 and 830 drive a shaft 834 in opposite directions through a reduction gear train 833. The shaft 834 carries a crank disc 835 which is connected through a pitman 836 to the valve stem 837 of the valve 115. The shaft 834 also operates the slider 809 with respect to the resistance element 808. When the valve 115 is moved towards an open position the slider 809 is moved towards the left and when the valve 115 is moved towards a closed position the slider 809 is moved to the right. Power is supplied to the motor 828 by means of line wires 842 and 843 leading from some source of power (not shown).

With the parts in the position shown the valve 115 is in the mid position and the concentration of the hygroscopic fluid in the sump 19 is substantially the same as the concentration of the hygroscopic fluid in the container 802. The Wheatstone bridge is therefore balanced and all the parts are at rest. If now the concentration of the hygroscopic fluid in the sump 19 should decrease the arm 807 operated by the polarized relay 806 is moved into engagement with the contact 840 to complete a circuit from the line wire 842 through arm 807, contact 840, wire 844, field winding 832, and wire 845 back to the other line wire 843. Completion of this circuit operates the valve 115 towards an open position and moves the slider 809 toward the left to rebalance the Wheatstone bridge circuit. When the valve 115 is moved sufficiently far towards an open position to cause the slider 809 to rebalance the Wheatstone bridge circuit the arm 807 is moved out of engagement with the contact 840 to stop further operation of the valve 115.

If now the concentration of the hygroscopic fluid in the sump 19 becomes higher than the concentration of the reference hygroscopic fluid in the container 802 the Wheatstone bridge circuit is unbalanced in the opposite direction to move the arm 807 into engagement with the contact 841. This completes a circuit from the line wire 842 through arm 807, contact 841, wire 846, field winding 831, and wire 845 back to the other line wire 843. Completion of this circuit operates the valve 115 towards a closed position and moves the slider 809 towards the right. When the slider 809 has moved sufficiently far toward the right the Wheatstone bridge circuit is rebalanced to move the arm 807 out of engagement with the contact 841 whereupon further closing movement of the valve 115 is prevented.

In the above manner the valve 115 is modulatingly positioned in accordance with the relative concentrations of the hygroscopic fluid in the sump 19 and the hygroscopic fluid within the container 802 to maintain the concentration of the hygroscopic fluid in the concentrator 19 at desired values. The setting of the control arrangement of Figure 6 may be varied by changing the concentration of the reference hygroscopic fluid in the container 802 or by changing the spacing of the electrodes 803 and 804 or by changing the spacing of electrodes 800 and 801.

If the control arrangement of Figure 6 for controlling the steam valve 115 is substituted for the control arrangement of the steam valve in Figures 1 and 4 then the steam valve 115 is controlled to maintain the concentration of the hygroscopic fluid in the sump 19 substantially constant at all times. If desired a second concentration responsive controller responsive to the concentration of the hygroscopic fluid in the concentrator 100 may be utilized for preventing the hygroscopic fluid in the concentrator 100 from becoming too highly concentrated. If the control arrangement of Figure 6 is utilized it would be desirable to stop operation of the pumps 60 and 71 by the step controllers 155 and 152 to render the sprays 15 and 18 inoperative when the outside dew-point temperature is between 35° and 55° and the enclosure dry bulb temperature is below 74°. Such an operation may be desirable from an economy standpoint. Under these conditions it is not absolutely necessary to have the sprays 15 and 18 operating since the relative humidity of the fresh air will be at practically the desired value.

From the above it is seen that I have provided a complete automatic air conditioning system for ventilating, cooling, dehumidifying, heating, and humidifying the air of an enclosure wherein desired relative humidity conditions and dry bulb temperature conditions are at all times maintained within the enclosure without the need of manual care. Although for purposes of illustration various temperature and humidity values have been utilized for disclosing this invention, these values may be altered somewhat to fit the needs of any installation and the type of hygroscopic fluid used.

Although for purposes of illustration one form of this invention has been disclosed, other forms thereof may become apparent to those skilled in the art upon reference to this disclosure and therefore this invention is to be limited only by the scope of the appended claims and prior art.

I claim as my invention:

1. In an air conditioning system, first and second dehumidifying zones, a cooling zone, means for causing a flow of air through said three zones successively, means introducing hygroscopic fluid into said first dehumidifying zone in contact with the air therein to effect dehumidification thereof, means withdrawing hygroscopic fluid from said first dehumidifying zone and introducing it into said second dehumidifying zone in contact with the air therein to effect a further dehumidification thereof, an evaporating zone, means conducting water to said evaporating zone, an absorbing zone communicating with said evaporating zone, means conducting hygroscopic fluid from said second dehumidifying zone to said absorbing zone where it absorbs water vapor from said evaporating zone, means conducting water from said evaporating zone to said cooling zone for cooling the air therein, means conducting a portion of the hygroscopic fluid from said absorbing zone and introducing it into said first dehumidifying zone in contact with the air therein, a concentrator for hygroscopic fluid, means for withdrawing the remainder of the hygroscopic fluid from said absorbing zone and conducting it to the concentrator, and means conducting the concentrated hygroscopic fluid from the concentrator and mixing it with the hygroscopic fluid withdrawn from the first dehumidifying zone for delivery to the second dehumidifying zone.

2. In an air conditioning system, a dehumidifying zone, means causing a flow of air through said zone, cooling means in said zone, means introducing hygroscopic fluid into said dehumidifying zone in contact with the air therein to effect dehumidification thereof, said dehumidified air being cooled by said cooling means, means for cooling the hygroscopic fluid after its contact with the air, an evaporating zone, means conducting water to said evaporating zone, an absorbing zone communicating with said evaporating zone, means conducting the cooled hygroscopic fluid from said dehumidifying zone to said absorbing zone where it absorbs water vapor from said evaporating zone, a cooling zone, means conducting water from said evaporating zone to said cooling zone for further cooling said dehumidified air, a concentrator for hygroscopic fluid, means for conducting hygroscopic fluid from said absorbing zone to said concentrator, and means for conducting hygroscopic fluid from said concentrator to said dehumidifying zone.

3. In an air conditioning system, a dehumidifying zone, means for causing a flow of air through said zone, means for introducing hygroscopic fluid into said dehumidifying zone in contact with the air to effect dehumidification thereof, an evaporating zone, means for introducing water into said evaporating zone, an absorbing zone communicating with said evaporating zone, means for withdrawing hygroscopic fluid from said dehumidifying zone and introducing it into said absorbing zone, a cooling zone, means for passing the dehumidified air through said cooling zone, means for withdrawing water from the evaporating zone and introducing it into the cooling zone for cooling the air therein, means for withdrawing a portion of the hygroscopic fluid from the absorbing zone and introducing it into the dehumidifying zone, a concentrator for the hygroscopic fluid, means for withdrawing the remainder of the hygroscopic fluid from the absorbing zone and conveying it to the concentrator for concentrating the same, means supplying a portion of the concentrated hygroscopic fluid to the dehumidifying zone, and means for supplying the rest of the concentrated hygroscopic fluid to the absorbing zone to increase the refrigerating effect on the water.

4. In an air conditioning system, a dehumidifying zone, means for passing air to be conditioned through said dehumidifying zone, means introducing hygroscopic fluid into the dehumidifying zone in contact with the air to effect dehumidification thereof, an evaporating zone, means for introducing water into said evaporating zone, an absorbing zone in communication with said evaporating zone, means for withdrawing hygroscopic fluid from said dehumidifying zone and introducing it into said absorbing zone to refrigerate the water in the evaporating zone, a cooling zone, means for causing the dehumidifying air to pass through said cooling zone, means for withdrawing water from the evaporating zone and introducing it into said cooling zone, means for withdrawing a portion of the hygroscopic fluid from the absorbing zone and introducing it to the dehumidifying zone, a concentrator for the hygroscopic fluid, means for withdrawing the remainder of the hygroscopic fluid from the absorbing zone and conducting it to said concentrator, means for supplying a portion of the concentrated hygroscopic fluid to the dehumidifying zone, means for supplying the rest of the concentrated hygroscopic fluid to the absorbing zone to increase the refrigerating effect on the water, and means for producing a vacuum in the evaporating and absorbing zones to increase further the refrigerating effect on the water.

5. In an air conditioning system, first and second dehumidifying zones, means for causing air to flow successively through said two dehumidifying zones, means for introducing hygroscopic fluid into the first dehumidifying zone in contact with the air to effect dehumidification thereof, means for withdrawing hygroscopic fluid from the first dehumidifying zone and introducing it into the second dehumidifying zone in contact with said air to effect further dehumidification thereof, an evaporating zone, means introducing water into said evaporating zone, an absorbing zone in communication with said evaporating zone, means for withdrawing hygroscopic fluid from the second dehumidifying zone and introducing it into said absorbing zone, a cooling zone, means for causing the dehumidified air to pass through said cooling zone, means for withdrawing refrigerated water from the evaporating zone and introducing it to the cooling zone for cooling the air therein, means for withdrawing a portion of the hygroscopic fluid from the absorbing zone and introducing it to the first dehumidifying zone, a concentrator for the hygroscopic fluid, means for withdrawing the remainder of the hygroscopic fluid from the absorbing zone and delivering it to the concentrator for concentrating the same, means for mixing the concentrated hygroscopic fluid with the hygroscopic fluid withdrawn from the first dehumidifying zone for delivery to the second dehumidifying zone, cooling means for cooling the concentrated hygroscopic fluid before delivery to the second dehumidifying zone, means for supplying concentrated hygroscopic fluid to the absorbing zone to increase the refrigerating effect on the water, and means producing a vacuum in the evaporating and absorbing zones to increase further the refrigerating effect on the water.

6. In an air conditioning system, first and second dehumidifying zones, means for introducing air to be conditioned into said first dehumidifying zone and then into said second dehumidifying zone, means for introducing hygroscopic fluid into the first dehumidifying zone in contact with said air to effect dehumidification thereof, means for withdrawing hygroscopic fluid from said first dehumidifying zone and introducing it into the second dehumidifying zone in contact with said air to effect further dehumidification thereof, an evaporating zone, means for introducing water into said evaporating zone, an absorbing zone in communication with said evaporating zone, means for introducing hygroscopic fluid from said second dehumidifying zone into said absorbing zone where it contacts the water vapor from said evaporating zone, a cooling zone, means for causing the dehumidified air to pass through said cooling zone, means for withdrawing refrigerated water from the evaporating zone and introducing it into said cooling zone to cool the dehumidified air, means for withdrawing a portion of the hygroscopic fluid from the absorbing zone and introducing it to the first dehumidifying zone, a concentrator for the hygroscopic fluid, means for withdrawing the remainder of the hygroscopic fluid from the absorbing zone and conducting it to the concentrator for concentrating the same, means for mixing the concentrated hygroscopic fluid with the hygroscopic fluid withdrawn from the first dehumidifying zone for delivery to the second dehumidifying zone, means responsive to the moisture content of the dehumidified air for controlling the concentration of the hygroscopic fluid, and means controlling the cooling effect performed by the refrigerated water to regulate the amount of sensible cooling obtained.

7. In an air conditioning system, a dehumidifying zone, means causing air to flow to said dehumidifying zone, means introducing hygroscopic fluid into the dehumidifying zone in contact with the air to effect dehumidification thereof, an evaporating zone, means introducing water into said evaporating zone, an absorbing zone in communication with said evaporating zone, means introducing hygroscopic fluid withdrawn from the dehumidifying zone into said absorbing zone whereby it contacts with the water vapor therein and refrigerates the water in evaporating zone, a cooling zone, means for withdrawing water from the evaporating zone and introducing it into said cooling zone, means for passing the dehumidified air through said cooling zone, means for withdrawing a portion of the hygroscopic fluid from the absorbing zone and introducing it to the dehumidifying zone, a concentrator for the hygroscopic fluid, means withdrawing the remainder of the hygroscopic fluid from the absorbing zone and conducting it to the concentrator for concentrating it, means conducting concentrated hygroscopic fluid to the dehumidifying zone, means supplying concentrated hygroscopic fluid to the absorbing zone to increase the refrigerating effect on the water, means responsive to the moisture content of the dehumidified air for controlling the concentration of the hygroscopic fluid, and means controlling the supply of concentrated fluid to the absorbing zone to regulate the amount of sensible cooling obtained.

8. In an air conditioning system, a dehumidifying zone, means for causing a flow of air through said dehumidifying zone, means for introducing hygroscopic fluid into said dehumidifying zone in contact with the air to effect dehumidification thereof, an evaporating zone, means introducing water into said evaporating zone, an absorbing zone in communication with said evaporating zone, means for withdrawing hygroscopic fluid from the dehumidifying zone and introducing it into said absorbing zone where it comes in contact with water vapor from the evaporating zone in order to refrigerate the water in the evaporating zone, a cooling zone, means for causing the dehumidified air to flow through said cooling zone, means for withdrawing water from the evaporating zone and introducing it into said cooling zone, means for withdrawing a portion of the hygroscopic fluid from the absorbing zone and introducing it to the dehumidifying zone, a concentrator for the hygroscopic fluid, means for withdrawing the remainder of the hygroscopic fluid from the absorbing zone and conducting it to the concentrator, means for supplying concentrated hygroscopic fluid to the dehumidifying zone, means for supplying concentrated hygroscopic fluid to the absorbing zone to increase the refrigerating effect on the water, means for producing a vacuum on the evaporating and absorbing zones also to increase the refrigerating effect on the water, means responsive to the moisture content of the dehumidified air for controlling the concentration of the hygroscopic fluid, means controlling the supply of concentrated fluid to the absorbing zone to regulate the amount of sensible cooling obtained, and means controlling the vacuum in the evaporating and absorbing zone also to regulate the amount of sensible cooling obtained.

9. In an air conditioning system, a dehumidifying zone, means for introducing air to be conditioned into said dehumidifying zone, means for introducing hygroscopic fluid into said dehumidifying zone in contact with the air to effect dehumidification thereof, means controlling the concentration of the hygroscopic fluid to maintain the moisture content of the air at desired values, an evaporating zone, means introducing water into said evaporating zone, an absorbing zone in communication with said evaporating zone, means introducing hygroscopic fluid withdrawn from the dehumidifying zone into said absorbing zone wherein contact with the water vapor from the evaporating zone refrigerates the water in the evaporating zone, a cooling zone, means for causing the dehumidified air to pass through said cooling zone, means for withdrawing refrigerated water from the evaporating zone and introducing it into the cooling zone, means in said dehumidifying zone for cooling the hygroscopic fluid to remove the latent heat of dehumidification when cooling is desired, said last named means employing a cooling fluid which is independent of the water used in said cooling zone, and means for interrupting the supply of refrigerated water to the cooling zone and the cooling of the hygroscopic fluid when heating is desired to effect heating of the air by the latent heat of dehumidification.

10. In an air conditioning system for an enclosure, means for mixing fresh air and return air from said enclosure, a cooling zone, means for passing the mixture of fresh air and return air through said cooling zone and delivering the cooled air to the enclosure, a dehumidifying zone, means for passing the fresh air to said dehumidifying zone, means for introducing hygroscopic fluid into said dehumidifying zone in contact with the air to effect dehumidification thereof, an evaporating zone, means for introducing water into said evaporating zone, an absorbing zone in communication with said evaporating zone, means for introducing hygroscopic fluid withdrawn from the dehumidifying zone into said absorbing zone in contact with the water vapor from the evaporating zone to refrigerate the water in the evaporating zone, means introducing refrigerated water from the evaporating zone into the cooling zone to effect cooling of the mixture of fresh and return air, means responsive to the moisture content of the dehumidified fresh air for controlling the concentration of the hygroscopic fluid introduced into the dehumidifying zone to maintain the moisture content of the dehumidified fresh air at the desired values, means for controlling the proportion of fresh dehumidified air and return air delivered to the enclosure for maintaining the moisture content of the air in the enclosure at desired values, and means responsive to dry bulb temperature of the air in the enclosure for controlling the cooling effects of the refrigerated water.

11. In an air conditioning system for an enclosure, means for mixing fresh and return air from the enclosure, a cooling zone, means for passing the mixture of fresh and return air through said cooling zone and delivering the air to the enclosure, a dehumidifying zone, means for passing the fresh air through said dehumidifying zone, means for introducing hygroscopic fluid into the dehumidifying zone in contact with the air to effect dehumidification thereof, means for controlling the concentration of the hygroscopic fluid to maintain the moisture content of the dehumidified fresh air at desired values, means controlling the proportion of dehumidified fresh air and return air delivered to the enclosure to maintain the moisture content of the air in the enclosure at the desired value, means for cooling the hygroscopic fluid to cool the dehumidified fresh air by removing the latent heat of dehumidification, means for introducing a cooling medium in the cooling zone to effect cooling of the mixture of fresh and return air when cooling is desired, means interrupting the cooling effect of the cooling medium and interrupting the cooling of the hygroscopic fluid to effect heating of the fresh air by the latent heat of dehumidification when heating is desired, and means proportioning the mixture of fresh and return air to utilize substantially all heated dehumidified fresh air when heating is desired.

12. In an air conditioning system for an enclosure, means for mixing fresh air and return air from the enclosure, a cooling zone, means for passing the mixture of fresh and return air through the cooling zone and delivering it to the enclosure, a dehumidifying zone, means for passing said fresh air through the dehumidifying zone, means introducing a hygroscopic fluid into the dehumidifying zone in contact with the fresh air to effect dehumidification thereof, an evaporating zone, means introducing water into said evaporating zone, an absorbing zone in communication with said evaporating zone, means for introducing hygroscopic fluid withdrawn from the dehumidifying zone into said absorbing zone in contact with the water vapor from the evaporating zone in order to refrigerate the water in the evaporating zone, means producing a vacuum in the evaporating and absorbing zone to increase the refrigerating effect on the water, means supplying concentrated hygroscopic fluid to the absorbing zone also to increase the refrigerating effect on the water, means introducing refrigerated water from the evaporating zone into the cooling zone to effect cooling of the mixture of fresh and return air, means for cooling the hygroscopic fluid in the dehumidifying zone when cooling is required for removing the latent heat of dehumidification, means responsive to the moisture content of the dehumidified fresh air for controlling the concentration of the hygroscopic fluid in the dehumidifying zone, means controlling the proportions of dehumidified fresh air and return air from the enclosure when cooling is desired in order to maintain the moisture content of the air in the enclosure at desired values, means controlling the introduction of refrigerated water into the cooling zone, the vacuum in the evaporating and absorbing zones and a supply of concentrated hygroscopic fluid to the absorbing zone to maintain desired dry bulb temperature conditions in the enclosure, means interrupting the supply of refrigerated water to the cooling zone and interrupting the cooling of the hygroscopic fluid in the dehumidifying zone when heating is desired, and means proportioning the mixture of fresh and return air to utilize substantially all the heated dehumidified fresh air when heating is desired.

13. In an air conditioning system for an enclosure, means for mixing fresh air and return air from the enclosure and delivering the mixture to the enclosure, means including means responsive to outside temperature conditions for dehumidifying the fresh air when the outside temperature conditions are relatively high and for heating and humidifying the fresh air when the outside temperature conditions are relatively low, means including means responsive to the dry bulb temperature of the enclosure for cooling the mixture of fresh and return air when the dry bulb temperature of the enclosure is relatively high and heating the mixture of the fresh and return air when the dry bulb temperature of the enclosure is relatively low, means for regulating the proportions of dehumidified fresh air and return air in accordance with relative humidity conditions in the enclosure when the outside temperature conditions are relatively high and for regulating the proportions of heated and humidified fresh air and return air to utilize a minimum amount of heated and humidified fresh air when the outside temperature conditions are relatively low.

14. In an air conditioning system for an enclosure, means for mixing fresh air and return air from the enclosure and for delivering the mixture of fresh air and return air to the enclosure, means for dehumidifying the fresh air when the outside temperature conditions are relatively high and for heating and humidifying the fresh air when the outside temperature conditions are relatively low, means for cooling the mixture of fresh and return air when the dry bulb temperature of the enclosure is relatively high and for heating the mixture of fresh and return air when the dry bulb temperature of the enclosure is relatively low, means for regulating the proportions of the dehumidified fresh air and return air in accordance with relative humidity conditions in the enclosure when the outside temperature conditions are relatively high, means for regulating the proportions of heated humidified fresh air and return air to utilize a minimum amount of heated and humidified fresh air when the outside temperature conditions are relatively low, and for regulating the proportions of fresh air and return air to utilize substantially all fresh air when the outside temperature conditions are at an intermediate value.

15. In an air conditioning system for an enclosure, means for mixing fresh air and return air from the enclosure and delivering the mixture of fresh air and return air back to the enclosure, means for cooling the mixture of fresh and return air when the dry bulb temperature of the enclosure is relatively high provided the outside temperature conditions are not relatively low, for heating the mixture of fresh and return air when the dry bulb temperature of the enclosure is relatively low provided the outside temperature conditions are not relatively high, and for controlling the heating and cooling of the mixture of fresh and return air depending upon whether the enclosure dry bulb temperature is relatively low or high when the outside temperature conditions are at an intermediate value, and means for dehumidifying the fresh air when the outside temperature conditions are relatively high and for heating and humidifying the fresh air when the outside temperature conditions are relatively low.

16. In an air conditioning system for an enclosure, means for mixing fresh and return air from the enclosure and delivering the mixture to said enclosure, means for cooling the mixture of fresh and return air when the dry bulb temperature of the enclosure is relatively high provided the outside conditions are not relatively low, means for heating the mixture of fresh and return air when the dry bulb temperature of the enclosure is relatively low provided the outside temperature conditions are not relatively high, means for controlling the heating or cooling of the mixture of fresh and return air depending upon whether the enclosure dry bulb temperature is relatively low or high when the outside temperature conditions are at an intermediate value, means for dehumidifying the fresh air when the outside temperature conditions are relatively high, means for heating and humidifying the fresh air when the outside temperature conditions are relatively low, means for regulating the proportions of the dehumidified fresh air and return air in accordance with relative humidity conditions in the enclosure when the outside temperature conditions are relatively high, and for regulating the proportions of heated and humidified fresh air and return air to utilize a minimum amount of heated and humidified fresh air when the outside temperature conditions are relatively low, and for regulating the proportions of fresh air and return air to utilize substantially all fresh air when the outside temperature conditions are at an intermediate value.

17. In an air conditioning system for an enclosure, means for mixing fresh and return air from the enclosure and for delivering the mixture of fresh air and return air to the enclosure, means for cooling the mixture of fresh and return air when the dry bulb temperature of the enclosure is relatively high provided the outside temperature conditions are not relatively low, means for heating the mixture of fresh and return air when the dry bulb temperature of the enclosure is relatively low provided the outside temperature conditions are not relatively high, said last two means acting to heat or cool the mixture of fresh air and return air depending upon whether the enclosure dry bulb temperature is relatively low or high when the outside temperature conditions are intermediate, means for contacting the fresh air with a hygroscopic fluid, means for regulating the concentration of the hygroscopic fluid to dehumidify the fresh air when the outside temperature conditions are relatively high, cooling means for removing the latent heat of dehumidification when the outside temperature conditions are relatively high and the dry bulb temperature of the enclosure is relatively high, means for decreasing the removal of the latent heat of dehumidification when the dry bulb temperature of the enclosure decreases whereby the enclosure may be heated by the latent heat of dehumidification when the outside temperature conditions are relatively high, and means for regulating the concentration and the temperature of the hygroscopic fluid to humidify and heat the fresh air when the outside temperature conditions are relatively low.

18. An air conditioning system for an enclosure, means for mixing fresh and return air from the enclosure and delivering said mixture to the enclosure, means for cooling the mixture of fresh and return air when the dry bulb temperature of the enclosure is relatively high provided the outside temperature conditions are not relatively low, means for heating the mixture of fresh and return air when the dry bulb temperature of the enclosure is relatively low provided the outside temperature conditions are not relatively high, said last two means being operative selectively to heat or cool the mixture of fresh air and return air depending upon whether the enclosure dry bulb temperature is relatively low or high when the outside temperature conditions are intermediate, means for introducing a hygroscopic fluid into contact with the fresh air, means for regulating the concentration of hygroscopic fluid to dehumidify the fresh air when the outside temperature conditions are relatively high, means for removing the latent heat of dehumidification when the outside temperature conditions are relatively high and the dry bulb temperature of the enclosure is relatively high, means for decreasing the removal of the latent heat of dehumidification when the dry bulb temperature of the enclosure is relatively low whereby the enclosure may be heated by the latent heat of dehumidification when the outside temperature conditions are relatively high, means for regulating the concentration and the temperature of the hygroscopic fluid to humidify and heat the fresh air when the outside temperature conditions are relatively low, means for regulating the proportions of dehumidified fresh air and return air in accordance with relative humidity conditions in the enclosures when the outside temperature conditions are relatively high and the enclosure dry bulb temperature is relatively high, said last named means being controlled to utilize substantially all warm dehumidified fresh air when the outside temperature conditions are relatively high and the enclosure dry bulb temperature is relatively low and to utilize substantially all fresh air when the outside temperature conditions are intermediate and to utilize a minimum of heated and humidified fresh air when the outside temperature conditions are relatively low.

19. In an air conditioning system for an enclosure, means for mixing fresh and return air from the enclosure and passing said mixture through a temperature changing zone and delivering it to the enclosure, a humidity regulating zone, means for passing the fresh air through said humidity regulating zone, means for introducing a hygroscopic fluid into said humidity regulating zone in contact with the fresh air, means for regulating the concentration of the hygroscopic fluid to dehumidify the fresh air when the outside temperature conditions are relatively high, cooling means for removing the latent heat of dehumidification when the outside temperature conditions are relatively high and the dry bulb temperature of the enclosure is relatively high, means for decreasing the removal of latent heat of dehumidification when the dry bulb temperature of the enclosure is relatively low, means for regulating the concentration and the temperature of the hygroscopic fluid to humidify and heat the fresh air when the outside temperature conditions are relatively low, an absorbing zone, an evaporating zone in communication with said absorbing zone, means for introducing water into said evaporating zone, means for withdrawing hygroscopic fluid from the humidity regulating zone and introducing it into said absorbing zone in contact with water vapor from said evaporating zone for refrigerating the water in the evaporator zone, means for supplying concentrated hygroscopic fluid to the absorbing zone to increase the refrigerating effect on the water, means for producing a vacuum in the evaporating and absorbing zones to further increase the refrigerating effect on the water, means for introducing refrigerated water from the evaporating zone into the temperature changing zone to effect cooling of the mixture of fresh and return air when the dry bulb temperature of the enclosure is relatively high provided the outside temperature conditions are not relatively low, means for introducing heating medium into the temperature changing zone to effect heating of the mixture of fresh and return air when the dry bulb temperature of the enclosure is relatively low provided the outside temperature conditions are not relatively high, means for regulating the proportions of dehumidified fresh air and return air delivered to the enclosure, said last named means being controlled to regulate the proportions of dehumidified fresh air and return air in accordance with the relative humidity conditions in the enclosure when the outside temperature conditions are relatively high and the enclosure dry bulb temperature is relatively high, and for regulating the proportions of dehumidified fresh air and return air to utilize substantially all warm dehumidified fresh air when the outside temperature conditions are relatively high and the enclosure dry bulb temperature is relatively low and for regulating the proportions of fresh air and return air for utilizing substantially all fresh air when the outside temperature conditions are intermediate and for utilizing a minimum of heated and humidified fresh air when the outside temperature conditions are relatively low.

20. In an air conditioning system for an enclosure, a dehumidifying zone, a cooling zone, means for causing air to pass through said two zones and into said enclosure, means for introducing a hygroscopic fluid into contact with the air in said dehumidifying zone, means for withdrawing hygroscopic fluid from said dehumidifying zone, concentrating the same, and returning concentrated hygroscopic fluid to said dehumidifying zone, an evaporator-absorber, means for introducing water into said evaporator-absorber and circulating it through said cooling zone and back to said evaporator-absorber, means for withdrawing hygroscopic fluid from said dehumidifying zone and introducing it into said evaporator-absorber for refrigerating the water therein, means for withdrawing hygroscopic fluid from said evaporator-absorber, means for introducing a portion of the concentrated hygroscopic fluid directly into said evaporator-absorber to increase the refrigerating effect on the water, and means responsive to the temperature of the hygroscopic fluid withdrawn from said evaporator-absorber for varying the amount of concentrated hygroscopic fluid delivered to said evaporator-absorber.

ROBERT B. P. CRAWFORD.